(12) United States Patent
Teranishi et al.

(10) Patent No.: US 10,754,473 B2
(45) Date of Patent: Aug. 25, 2020

(54) DISPLAY DEVICE AND DRIVING METHOD

(71) Applicant: Japan Display Inc., Tokyo (JP)

(72) Inventors: Yasuyuki Teranishi, Tokyo (JP); Gen Koide, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 16/444,136

(22) Filed: Jun. 18, 2019

(65) Prior Publication Data

US 2019/0384478 A1    Dec. 19, 2019

(30) Foreign Application Priority Data

Jun. 18, 2018  (JP) .................................. 2018-115464

(51) Int. Cl.
*G06F 3/041* (2006.01)
*G09G 3/36* (2006.01)

(52) U.S. Cl.
CPC ...... *G06F 3/04184* (2019.05); *G06F 3/04166* (2019.05); *G09G 3/3677* (2013.01); *G09G 2310/0286* (2013.01)

(58) Field of Classification Search
CPC combination set(s) only.
See application file for complete search history.

(56) References Cited

U.S. PATENT DOCUMENTS

2014/0104510 A1    4/2014  Wang et al.
2018/0181244 A1*   6/2018  Sato .................. G11C 19/28

FOREIGN PATENT DOCUMENTS

JP          2014-81935 A      5/2014

* cited by examiner

*Primary Examiner* — Deeprose Subedi
(74) *Attorney, Agent, or Firm* — K&L Gates LLP

(57) ABSTRACT

According to one embodiment, a display device includes a display portion, a touch detection circuit and a scanning line drive circuit. A frame period, which includes a display period in which the scanning signal is supplied to the plurality of scanning lines for image display, and a touch detection period related to sensing using the plurality of electrodes, includes a first frame and a second frame. The number of scanning lines to which the scanning signal is supplied in each display period included in the first and second frames is adjusted such that a potential of the touch detection period included in the first frame matches a potential of the touch detection period included in the second frame.

20 Claims, 15 Drawing Sheets

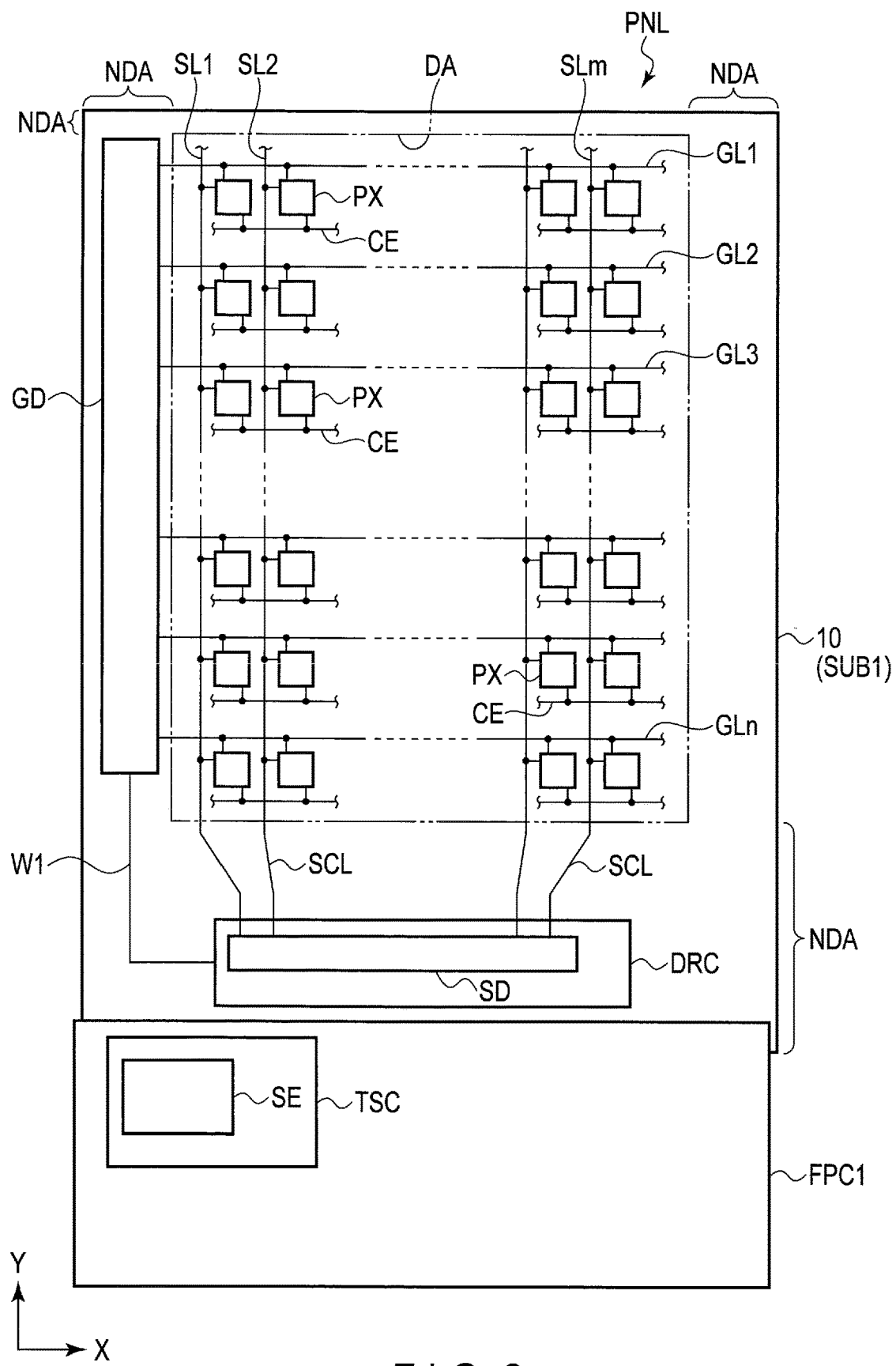
F I G. 2

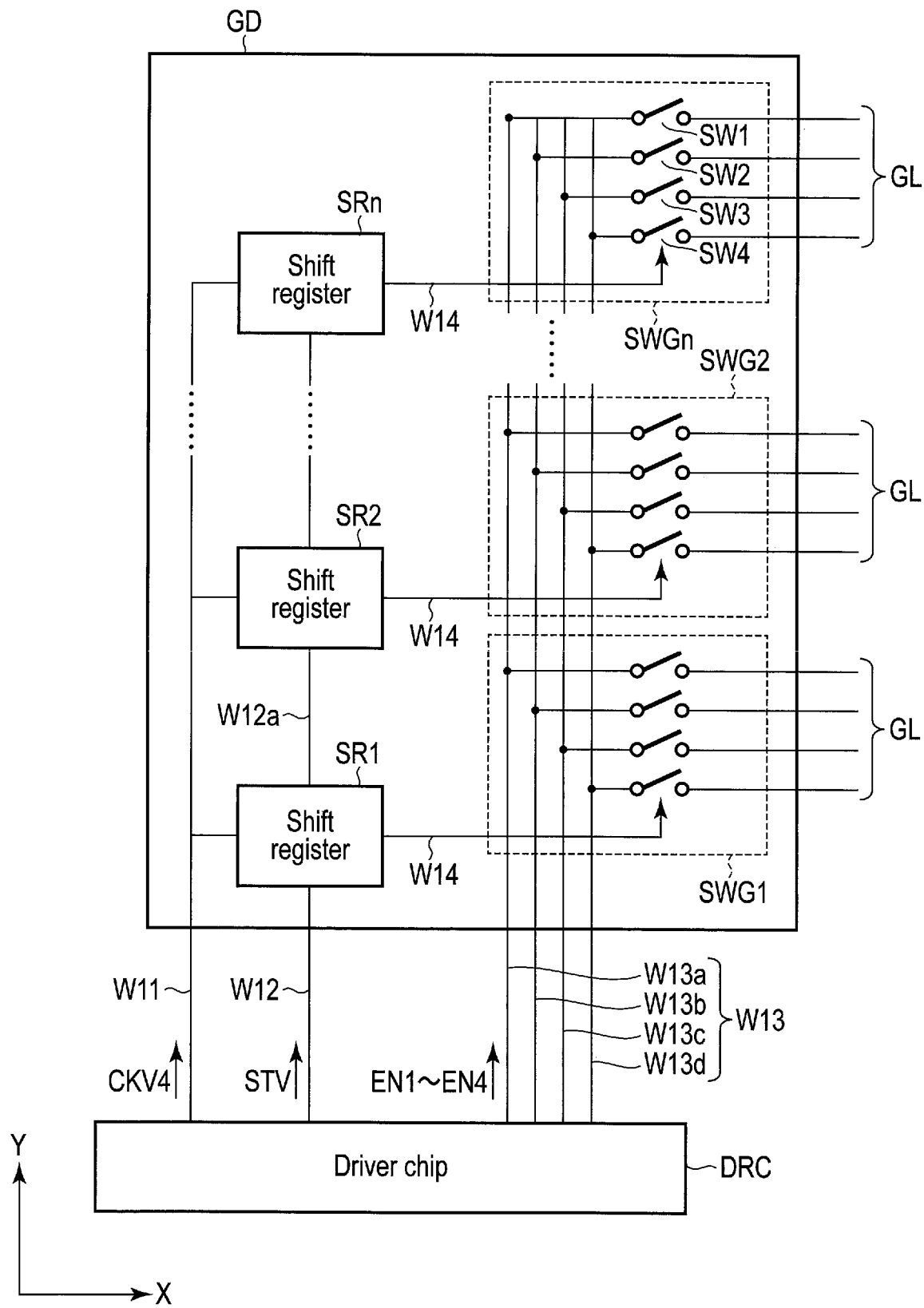
F I G. 11

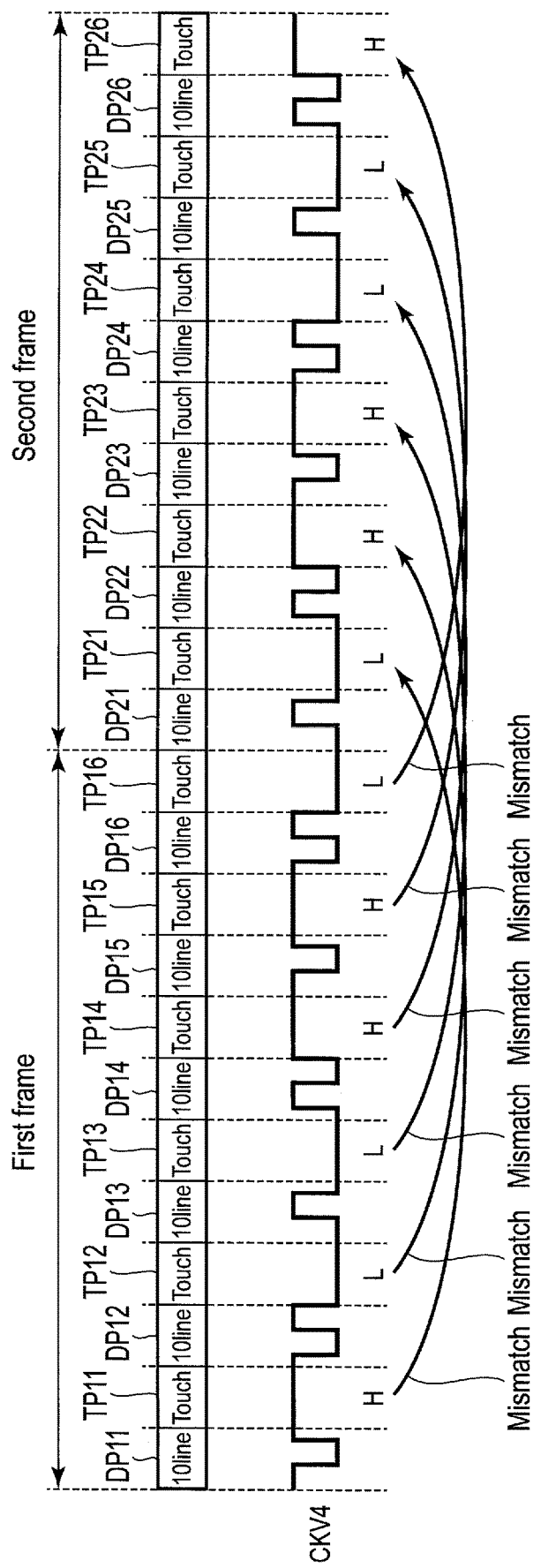
F I G. 15

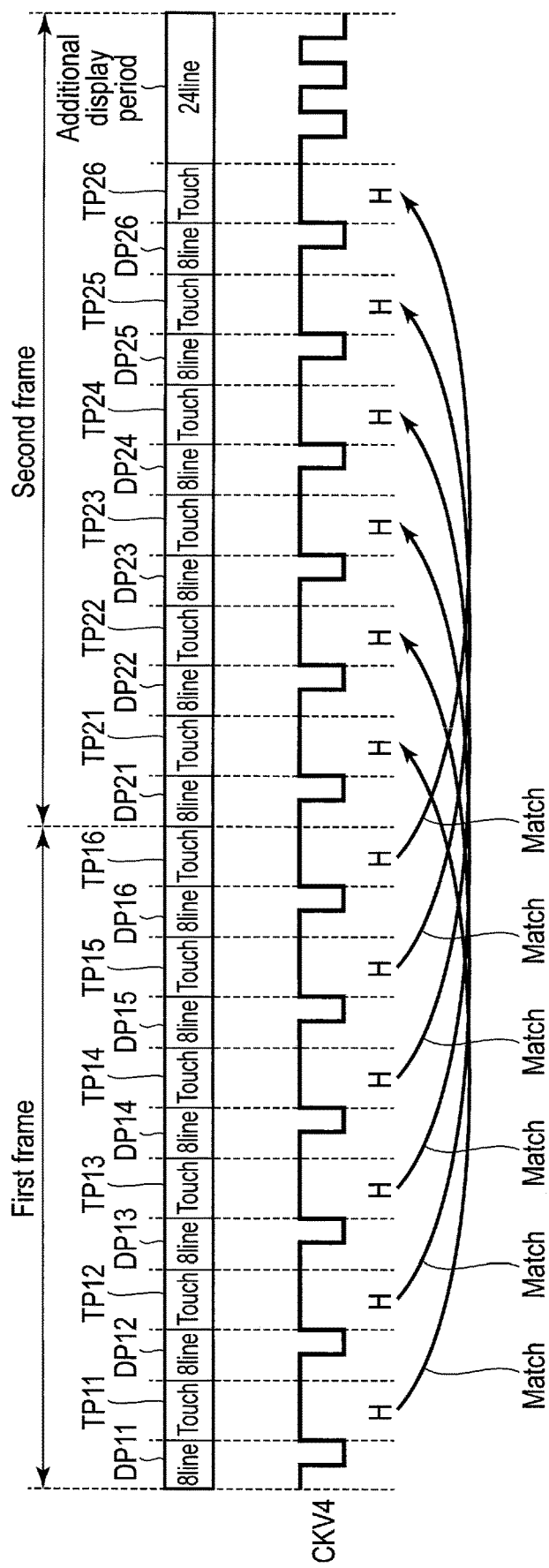
F I G. 16

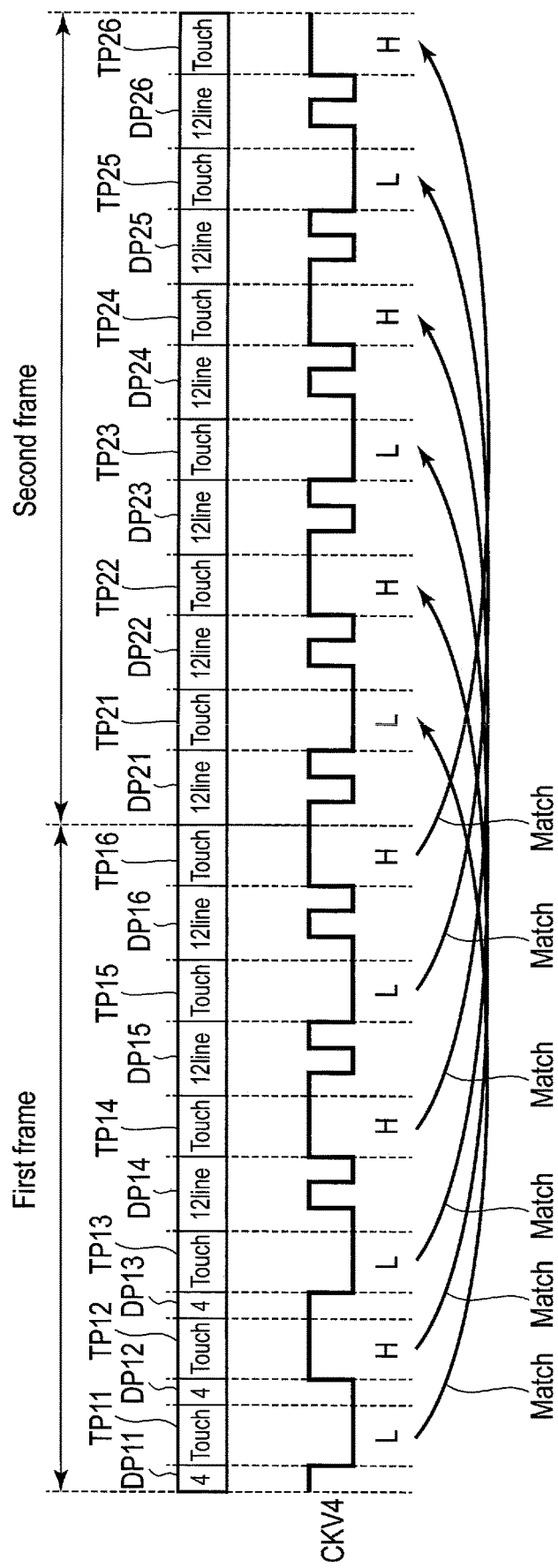
F I G. 18

DISPLAY DEVICE AND DRIVING METHOD

CROSS-REFERENCE TO RELATED APPLICATIONS

This application is based upon and claims the benefit of priority from Japanese Patent Application No. 2018-115464, filed Jun. 18, 2018, the entire contents of which are incorporated herein by reference.

FIELD

Embodiments described herein relate generally to a display device having an input function, and a driving method.

BACKGROUND

Portable terminals such as smartphones, tablet personal computers, and laptop personal computers are prevalently used. The portable terminal has a flat-panel display device in which a liquid crystal or an organic EL element, etc., is used. The display device is connected to a host device which outputs pixel data or commands, etc., and comprises a display panel, and a driver which processes the command and drives the display panel.

In the display device, pixels which are two-dimensionally arranged on a display panel comprise a common electrode and a pixel electrode, and the liquid crystal or the organic EL element is disposed between the common electrode and the pixel electrode. When the driver writes a pixel signal to the pixel of the display panel, the liquid crystal or the organic EL element between the common electrode and the pixel electrode is controlled, and an image is displayed.

Meanwhile, a display device which detects approach or contact of an input object such as a finger or a touch pen (also referred to as a stylus pen) on a screen has been widely used. An operation of causing the input object to approach or contact the screen is referred to as a touch operation or a touch, and position detection of the input object is referred to as touch detection. A touch detection method includes various types of methods such as optical, resistance, capacitive, and electromagnetic induction methods. The capacitive method corresponds to a detection method which uses occurrence of a change of an electrostatic capacitance between a pair of electrodes (referred to as a drive electrode and a detection electrode) by approach or contact of an input object, and has an advantage of having a relatively simple structure, and having small power consumption.

In the display device having the aforementioned touch detection function, as the capacitive-type detection method, a method of performing the detection by using occurrence of a change of an earth capacitance of the detection electrode by approach or contact of an object, more specifically, a method known as self capacitive sensing, is employed. In the self capacitive sensing, the drive electrode also serves as the detection electrode which detects approach or contact of the object.

For example, when a plurality of drive electrodes extend along a longitudinal direction of the display panel, and are arranged in parallel along a lateral direction, a select circuit which selects a video signal line, a self-capacitance detection line, and a driver chip which supplies a signal to the video signal line are arranged in this order a/t a lower area in the longitudinal direction of a peripheral area surrounding a display area.

In the arrangement as described above, the self-capacitance detection line is formed to extend along the lateral direction, while a connection line which supplies a signal to the video signal line is formed to extend along the longitudinal direction. Accordingly, the self-capacitance detection line and the connection line which supplies the signal to the video signal line cross each other, and a parasitic capacitance produced by this crossover constitutes a load at a driving operation by the self capacitive sensing. In particular, a load of the parasitic capacitance more greatly impacts detection in the self capacitive sensing than in mutual capacitive sensing.

BRIEF DESCRIPTION OF THE DRAWINGS

FIG. 2 is a plan view showing an example of the display device.

FIG. 11 is an illustration showing a circuit configuration of a scanning line drive circuit.

FIG. 15 is an illustration showing an example of a change of a potential of a clock signal.

FIG. 16 is an illustration showing an example of a change of the potential of the clock signal.

FIG. 18 is an illustration showing an example of a change of the potential of the clock signal.

DETAILED DESCRIPTION

Figure 1:
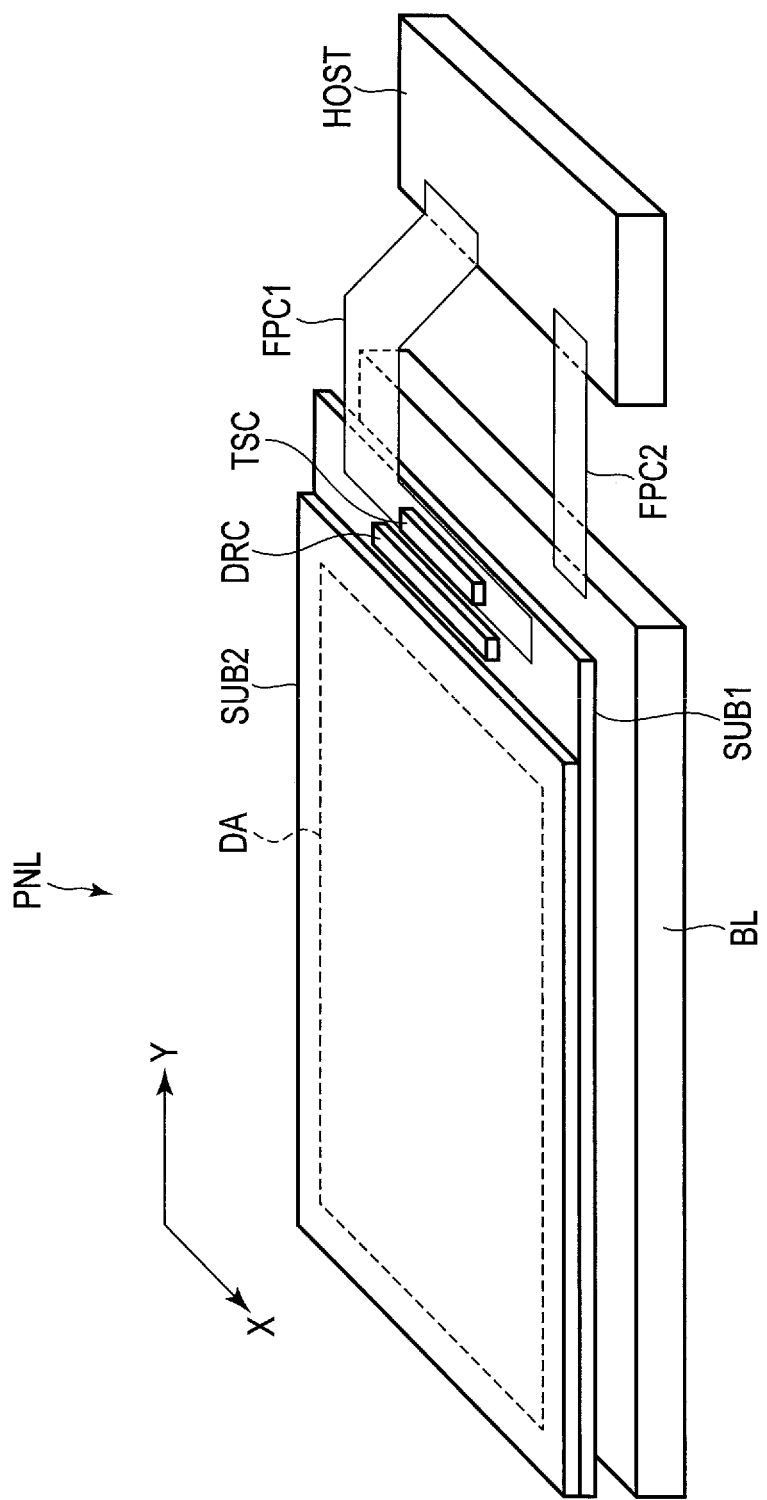
FIG. 1 is a perspective view showing a schematic structure of an example of a display device of an embodiment.

In general, according to one embodiment, a display device comprises a display portion, a touch detection circuit and a scanning line drive circuit. The display portion comprises a plurality of electrodes which are arranged two-dimensionally on a substrate. The touch detection circuit supplies a drive signal for touch detection to an electrode selected from among the plurality of electrodes, receives a signal from the selected electrode, and outputs a guard signal for reducing a parasitic capacitance to unselected electrodes. The scanning line drive circuit supplies a scanning signal to a plurality of scanning lines extending in the display portion. A frame period, which comprises a display period in which the scanning signal is supplied to the plurality of scanning lines for image display, and a touch detection period related to sensing using the plurality of electrodes, includes a first frame and a second frame. The number of scanning lines to which the scanning signal is supplied in each display period included in the first and second frames is adjusted such that a potential of the touch detection period included in the first frame matches a potential of the touch detection period included in the second frame.

According to another embodiment, a method is a method for driving a display device which comprises: a display portion comprising a plurality of electrodes arranged two-dimensionally on a substrate; a touch detection circuit which supplies a drive signal for touch detection to an electrode selected from among the plurality of electrodes, receives a signal from the selected electrode, and outputs a guard signal for reducing a parasitic capacitance to unselected electrodes; and a scanning line drive circuit which supplies a scanning signal to a plurality of scanning lines extending in the display portion. A frame period, which comprises a display period in which the scanning signal is supplied to the plurality of scanning lines for image display, and a touch detection period related to sensing using the plurality of electrodes, includes a first frame and a second frame. The method comprises adjusting the number of scanning lines to which the scanning signal is supplied in each display period included in the first and second frames such that a potential of the touch detection period included in the first frame matches a potential of the touch detection period included in the second frame.

According to yet another embodiment, a display device comprises a display portion and a scanning line drive circuit. The display portion comprises a plurality of electrodes which are arranged two-dimensionally on a substrate. The scanning line drive circuit supplies a scanning signal to a plurality of scanning lines extending in the display portion. The scanning line drive circuit comprises a plurality of switch groups and a plurality of shift registers. The plurality of switch groups include a plurality of switches connected to the plurality of scanning lines, respectively. The plurality of shift registers are provided for the plurality of switch groups, respectively. A frame period, which comprises a display period in which the scanning signal is supplied to the plurality of scanning lines for image display, and a touch detection period related to sensing using the plurality of electrodes, includes a first frame and a second frame. The scanning line drive circuit selects one of the switch groups and one of the shift registers in sequence so that a potential of the touch detection period included in the first frame matches a potential of the touch detection period included in the second frame, and selects a switch of the plurality of switches included in the selected switch group one by one to supply the scanning signal to the scanning line connected to the selected switch.

Embodiments will be described hereinafter with reference to the accompanying drawings. Note that the disclosure is merely an example, and the present invention is not limited by the disclosure of the embodiments below. Modifications easily conceivable by a person skilled in the art come within the scope of the disclosure as a matter of course. In order to make the description clearer, in the drawings, the size, shape, etc., of each part may be represented schematically with some changes added, and not as it is. Further, hatching added to distinguish a structure may be omitted. The same reference number may be added to the corresponding elements in the drawings, and detailed description of such elements may be omitted.

A display device with a touch detection function includes an on-cell type (also called an external type) device, which is obtained by manufacturing a display device and a touch panel that realizes the touch function separately, and attaching the touch panel to a screen of the display device, and an in-cell type (also called an internal type) device in which the display device and the touch panel are integrated. The in-cell type display device includes a device in which a part of or all of the components having the touch detection function are also used as a part of or all of the components having a display function, and a device in which components having the touch detection function and components having the display function are not shared with each other. In the in-cell type display device, for example, a detection electrode is formed between a color filter and a polarizer, and a common electrode formed on a TFT substrate is also used as a drive electrode. Since no external touch panel is provided in the in-cell type display device, the entire body is made slim and light, and the visibility of display is also improved. In the present embodiment, an in-cell type display device will be described. However, the present invention is also applicable to an on-cell type display device.

A touch detection method includes various types of methods such as optical, resistance, capacitive, and electromagnetic induction methods. The capacitive method corresponds to a detection method which uses occurrence of a change of an electrostatic capacitance between a pair of electrodes (referred to as a drive electrode and a detection electrode) by approach or contact of an input object, and has an advantage of having a relatively simple structure, and having small power consumption. As the embodiment, a display device with a capacitive-type touch detection function will be described. However, the present invention is not limited to be applied to the capacitive-type touch detection, and may be applied to the other types of touch detection such as electromagnetic induction type touch detection.

The capacitive method includes mutual capacitive sensing which detects an electrostatic capacitance between two detection electrodes arranged to be opposed to each other in a state separated from each other, and self capacitive sensing which detects an electrostatic capacitance between one detection electrode and an object at a reference potential such as the ground potential. As one example, the self capacitive sensing will be described, but the present invention can also be applied to a display device which performs mutual-capacitive touch detection. In the self capacitive sensing, it suffices that an electrode to which the reference potential is supplied is a conductor pattern that is arranged around the detection electrode at a distance of allowing formation of electrostatic capacitance which is detectable between the detection electrode and the conductor pattern, and to which a path to supply a fixed potential is connected. More specifically, the shape, etc., is not particularly limited. A display device having the touch detection function is one form of an input device, and such a display device detects an input signal when an input tool such as a finger or a touch pen approaches or contacts a touch screen, and also calculates a touch position. The touch position corresponds to coordinates of a point at which the input signal of the touch screen is detected.

As the display device, while a liquid crystal display device, an organic EL display device, a plasma display device, or the like, can be used, here, as one example, an embodiment in which a liquid crystal display device is used will be described. Note that the present invention can also be applied to an organic EL display device, a plasma display device, and the like. A display mode of the liquid crystal display device is broadly classified into two types by a direction of application of an electric field for changing the alignment of liquid crystal molecules of a liquid crystal layer, which is a display function layer. The first type is the so-called longitudinal electric field mode in which the electric field is applied in a thickness direction (or an out-of-plane direction) of the display device. The longitudinal electric field mode includes, for example, a twisted nematic (TN) mode, and a vertical alignment (VA) mode. The second type is the so-called lateral electric field mode in which the electric field is applied in a planar direction (or an in-plane direction) of the display device. The lateral electric field mode includes, for example, an in-plane switching (IPS) mode, and a fringe field switching (FFS) mode, which is one mode of the IPS mode. Although the technology described below can be applied to both of the longitudinal electric field mode and the lateral electric field mode, as the embodiment, a display device of the lateral electric field mode will be explained.

[Schematic Structure]

FIG. 1 is a perspective view showing an overall schematic structure of an example of a display device with a touch detection function according to an embodiment. The display device comprises a display panel PNL having a touch detection mechanism, a touch detection chip TSC, and a driver chip DRC. The display panel PNL includes a transparent first substrate SUB1 made of glass or resin, etc., a transparent second substrate SUB2 made of glass or resin, etc., which is disposed to be opposed to the first substrate SUB1, and a liquid crystal layer (not shown) which is interposed between the first substrate SUB1 and the second substrate SUB2. Since pixels (FIG. 4) are disposed in an array two-dimensionally (may also be described as arranged in a matrix) in an X direction and a Y direction, the first substrate SUB1 is also called a pixel substrate or an array substrate. The second substrate SUB2 is also called a counter-substrate. The display panel PNL is observed from the side of the second substrate SUB2. Accordingly, the second substrate SUB2 may be referred to as an upper substrate, and the first substrate SUB1 may be referred to as a lower substrate.

The display panel PNL has a rectangular flat shape, and a direction along the short side is referred to as the X direction, and a direction along the long side is referred to as the Y direction. While the sizes of the short sides of the first substrate SUB1 and the second substrate SUB2 are substantially the same, the sizes of the long sides are different. The long side of the first substrate SUB1 is greater than the long side of the second substrate SUB2. In the Y direction along the long side, since the positions of one end of the first substrate SUB1 and one end of the second substrate SUB2 are aligned, the other end of the first substrate SUB1 is projected as compared to the other end of the second substrate SUB2. The driver chip DRC, which drives the display panel PNL to display an image, is mounted at a part of the first substrate SUB1 which is more projected than the second substrate SUB2 in the Y direction. The driver chip DRC is also called a driver IC or a display controller IC. An area in which the pixels are arranged in an array two-dimensionally is referred to as a display area or an active area DA, and a non-display area NDA other than the display area DA is also referred to as a frame area.

The display device may be connected to a host device HOST. The display panel PNL and the host device HOST are connected to each other via two flexible printed circuits, i.e., flexible printed circuits FPC1 and FPC2. The host device HOST is connected to the first substrate SUB1 via the flexible printed circuit FPC1. The touch detection chip TSC which controls touch detection is a COF (Chip On Film) chip disposed on the flexible printed circuit FPC1. The touch detection chip TSC is also called a touch detector IC or a touch controller IC. The touch detection chip TSC may be a COG (Chip On Glass) chip disposed on the first substrate SUB1 instead of the flexible printed circuit FPC1.

The driver chip DRC and the touch detection chip TSC are electrically connected to each other by a timing pulse or the like, and the operation timings are linked. The driver chip DRC and the touch detection chip TSC may be structured as the same IC instead of separate ICs. In this case, a single IC may be disposed on the first substrate SUB1 or on the flexible printed circuit FPC1. The driver chip DRC may also be disposed on the flexible printed circuit FPC1 instead of the first substrate SUB1.

A backlight unit BL as an illumination device, which illuminates the display panel PNL, is provided on a back side of the first substrate SUB1 (in other words, a rear side of the display panel PNL). The host device HOST is connected to the backlight unit BL via the flexible printed circuit FPC2. As the backlight unit BL, various forms of backlight units can be used. Further, as a light source, a product using a light-emitting diode (LED), a product using a cold-cathode fluorescent tube (CCFL), or the like, is available. As the backlight unit BL, an illumination device which uses a light guide arranged on the rear side of the display panel PNL, and the LED or the cold-cathode fluorescent tube arranged on a side surface side of the display panel PNL may be employed. Alternatively, an illumination device which uses a point light source in which light-emitting elements are arranged planarly on the rear side of the display panel PN may be used. A light unit to be used for the illumination device is not limited to a back light, and a front light disposed on a display surface side of the display panel PNL can also be used. When the display device is a reflective display device, or when the display panel PNL uses organic EL, a structure omitting an illumination device may be employed. Though not illustrated in the drawing, the display device comprises a secondary battery, a power supply circuit, and the like.

Referring to the example of FIG. 1, a vertically long screen in which the length in the Y direction is greater than the length in the X direction, and the X direction is assumed as the horizontal direction has been explained. However, the example may be applied to a horizontally long screen in which the length in the X direction is greater than the length in the Y direction.

[Circuit Configuration]

Figure 3:
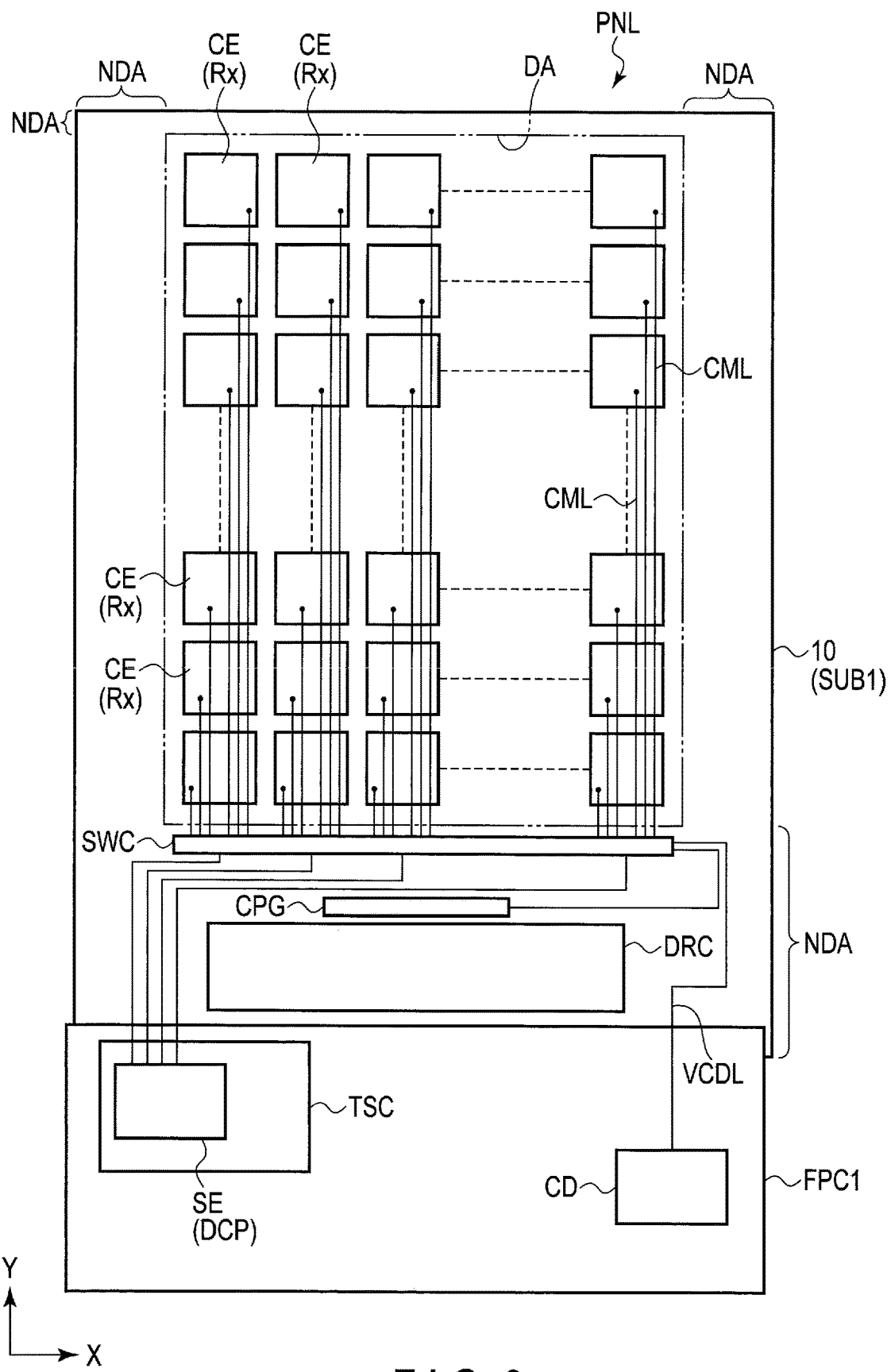
FIG. 3 is a plan view showing an example of arrangement of common electrodes CE of the display device.

FIG. 2 is a plan view showing an example of the display device of the embodiment. FIG. 3 is a plan view showing an example of arrangement of common electrodes. For the sake of viewability, structural members of the display panel PNL are shown separately in FIGS. 2 and 3.

As shown in FIG. 2, the driver chip DRC comprises a signal line drive circuit SD which drives the display panel PNL. The touch detection chip TSC comprises a detector SE having the function of performing touch detection by a capacitive method. The detector SE comprises a detection circuit DCP (FIG. 3) which controls a touch detection operation, and also processes a signal output from a detection electrode Rx (see FIG. 3). The structure of the detector SE as the touch detection circuit, and a method of detection by the detector SE will be described later. Though not illustrated in the drawing, the display device comprises a control module or the like provided at an outer part of the display panel PNL, and the control module may be electrically connected to the display panel PNL via the flexible printed circuit FPC1. The detection circuit DCP may be arranged inside the driver chip DRC.

As shown in FIG. 3, the display panel PNL comprises a plurality of detection electrodes Rx disposed in an array two-dimensionally in the X direction and the Y direction within the display area DA. While details will be described later, the detector SE detects a change in the electrostatic capacitance of each of the detection electrodes Rx. Since the detection electrodes Rx are provided inside the display panel PNL, the embodiment corresponds to an in-cell type display device with the touch detection function. In one example, a planar shape of the detection electrode Rx is a square, but the detection electrode Rx may be formed in an octagonal shape formed by slightly cutting off corners of a square, or a shape formed by making the corners of the square arcuate.

Figure 4:
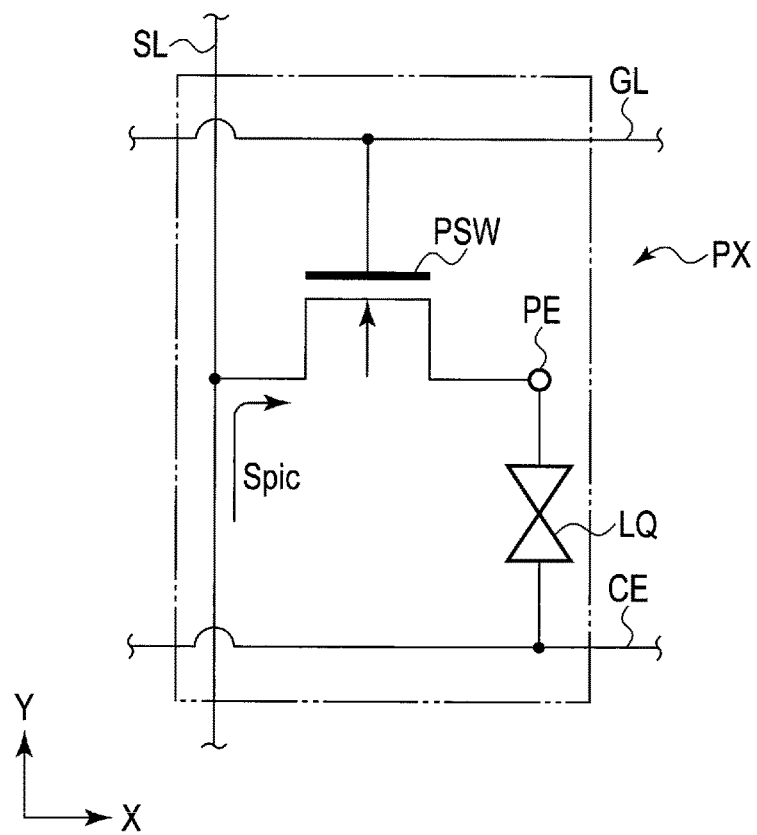
FIG. 4 is a circuit diagram showing an example of a pixel PX of the display device.

As shown in FIG. 2, the driver chip DRC is provided at the non-display area NDA, which is an area outside the display area DA, of the display panel PNL on the first substrate SUB1. The driver chip DRC comprises the signal line drive circuit SD, etc., which drives the liquid crystal layer, not shown, corresponding to an electro-optical layer, via a signal conductive line SCL and a signal line SL. As shown in FIG. 4, the signal line drive circuit SD supplies a video signal Spic to a pixel electrode PE of a pixel PX via the signal conductive line SCL and the signal line SL.

In the display area DA, m×n pixels PX are disposed in an array two-dimensionally in the X direction and the Y direction. Here, m and n each represent an arbitrary positive integer. A plurality of signal lines SL extending in the Y direction are arranged to be spaced apart from each other in the X direction. Signal lines SL1, SL2, . . . , SLm (may be generically called SL), the number of which is m, are arranged in the order of SL1, SL2, . . . , SLm, from one side of the X direction toward the other side. One end of each of the signal lines SL is drawn to the non-display area NDA outside the display area DA, and is electrically connected to the driver chip DRC via the connection line SCL for signal serving as a connection line (also referred to as a lead).

While the signal line SL and the connection line SCL for signal are both video signal lines for transmitting video signals, the signal line SL and the connection line SCL for signal can be distinguished as stated below. Of signal transmission paths that are connected to the driver chip DRC and supply the video signals to the respective pixels PX, a line which is arranged within the display area DA is called the signal line SL, and a line which is outside the display area DA is called the connection line SCL for signal. The signal lines SL extend linearly in the Y direction parallel to each other. Since the connection lines SCL for signal are lines connecting the signal lines SL and the driver chip DRC, the connection lines SCL for signal include a fan-like bent portion as a whole between the signal lines SL and the driver chip DRC.

The signal line SL and the driver chip DRC may be directly connected to each other via the connection line SCL for signal, or some other circuit may be arranged between the signal line SL and the driver chip DRC. For example, an RGB select switch for selecting a red video signal, a green video signal, or a blue video signal may be interposed between the signal line SL and the driver chip DRC. The RGB select switch is, for example, a multiplexer circuit, and signals formed of a red video signal, a green video signal, and a blue video signal that are multiplexed are input, and the input video signals are output selectively to the signal lines SL for respective colors. In this case, the number of connection lines SCL for signal connecting between the RGB select switch and the driver chip DRC is less than the number of signal lines SL.

A scanning line drive circuit GD as a scanning signal output circuit which sequentially outputs scanning signals to a plurality of scanning lines G is provided at the non-display area NDA on the first substrate SUB1. The driver chip DRC is connected to the scanning line drive circuit GD via a conductive line W1, and supplies a control signal such as a clock signal or an enable signal to the scanning line drive circuit GD via the conductive line W1 (the details of which will be described later). The plurality of scanning lines GL extending in the X direction are arranged to be spaced apart from each other in the Y direction. Scanning lines GL1, GL2, . . . , GLn (may be generically called GL), the number of which is n, are arranged in the order of GL1, GL2, . . . , GLn, from one side of the Y direction toward the other side. One end of each of the scanning lines GL is drawn to the non-display area NDA outside the display area DA, and is connected to the scanning line drive circuit GD. The scanning lines GL and the signal lines SL cross each other.

FIG. 2 shows an example in which the scanning line drive circuit GD is arranged on one side in the X direction, and no scanning line drive circuit GD is arranged on the other side. However, various modifications can be made for the layout of the scanning line drive circuit GD. For example, the scanning line drive circuits GD may be arranged on one side and the other side in the X direction, respectively, and the display area DA may be arranged between these two scanning line drive circuits GD. A buffer circuit which shapes the waveform of the control signal may be connected between the driver chip DRC and the scanning line drive circuit GD.

As shown in FIG. 3, a plurality of common electrodes CE are disposed in an array two-dimensionally in the X direction and the Y direction. A common line CML is connected to each of the common electrodes CE. The common electrode CE is connected to a switch circuit unit SWC via the common line CML. A common electrode drive circuit CD (also referred to as a common potential circuit) which drives the common electrode CE when displaying an image is arranged on the flexible printed circuit FPC1, and is electrically connected to the plurality of common electrodes CE via a common potential supply line VCDL, the switch circuit unit SWC, and the respective common lines CML.

In the embodiment, the common electrode CE also serves as the detection electrode Rx for touch detection of self capacitive sensing. Accordingly, the common lines CML include the function as a detection signal transmission line which transmits a signal detected by the detection electrode Rx to the detector SE.

While details will be described later, since touch detection by self capacitive sensing is performed by using the detection electrode Rx, the common lines CML include the function as a signal transmission line for inputting a drive waveform corresponding to a write signal to the detection electrodes Rx.

The number of common electrodes CE may be equal to the number of pixels PX shown in FIG. 2, or less than that of pixels PX. When the number of common electrodes CE operating as the detection electrodes Rx is equal to that of pixels PX, a resolution of touch detection becomes substantially the same as a resolution of display image. When the number of common electrodes CE is less than that of pixels PX, although the resolution of touch detection is lower than the resolution of display image, the number of common lines CML can be reduced. Generally, the resolution of display image is high as compared to the resolution of touch detection. Accordingly, the number of common electrodes CE may be less than that of pixels PX. For example, when a plane area of one detection electrode Rx is approximately 4 mm$^2$ to 36 mm$^2$, a single detection electrode Rx overlaps approximately several tens to several hundreds of pixels PX.

While details will be described later, the switch circuit unit SWC to which the common lines CML are connected is arranged outside the driver chip DRC. The switch circuit unit SWC is arranged at the non-display area NDA on the first substrate SUB1. A control pulse generation circuit CPG is connected to the switch circuit unit SWC.

The control pulse generation circuit CPG is a circuit which selectively turns on or off switches that are included in the switch circuit unit SWC. The control pulse generation circuit CPG is arranged outside the driver chip DRC, at the non-display area NDA on the first substrate SUB1, for example. When the control pulse generation circuit CPG is arranged outside the driver chip DRC, versatility of the driver chip DRC is improved. The control pulse generation circuit CPG may be arranged inside the driver chip DRC.

Arrangement of the scanning line drive circuit GD (FIG. 2) or the common electrode drive circuit CD (FIG. 3) is not limited to the form shown in FIGS. 2 and 3. For example, the scanning line drive circuit GD and/or the common electrode drive circuit CD may be arranged in the driver chip DRC. The common electrode drive circuit CD may be arranged on the first substrate SUB1 shown in FIG. 2. The common electrode drive circuit CD may be arranged in the non-display area NDA. The common electrode drive circuit CD may be arranged outside the display panel PNL, and may be connected to the display panel PNL via the flexible printed circuit FPC1.

As shown in FIG. 4, each of the pixels PX comprises a pixel switch PSW and the pixel electrode PE. A plurality of pixels PX may share a single common electrode CE. The pixel switch PSW comprises, for example, a thin-film transistor (TFT). The pixel switch PSW is electrically connected to the scanning line GL and the signal line SL. Although a semiconductor layer of the pixel switch PSW is formed of, for example, polycrystalline silicon (polysilicon), the semiconductor layer may be formed of amorphous silicon.

The pixel electrode PE is electrically connected to the pixel switch PSW. The pixel electrode PE is opposed to the common electrode CE via an insulating film not shown. A liquid crystal layer LQ is disposed between the pixel electrode PE and the common electrode CE.

On the basis of a drive signal applied to each electrode during a display period in which a display image is formed based on the video signal, an electric field is produced between the pixel electrode PE and the common electrode CE. Liquid crystal molecules that constitute the liquid crystal layer LQ corresponding to an electro-optical layer are driven by the electric field produced between the pixel electrode PE and the common electrode CE. In a display device which uses the lateral electric field mode, the pixel electrode PE and the common electrode CE are provided on the first substrate SUB1. The liquid crystal molecules that constitute the liquid crystal layer LQ are rotated by use of an electric field produced between the pixel electrode PE and the common electrode CE (for example, an electric field substantially parallel to a main surface of a substrate of a fringe field).

In the display period, each of the pixel electrode PE and the common electrode CE function as a drive electrode which drives the liquid crystal layer LQ corresponding to the electro-optical layer. The pixel electrodes PE are referred to as a first drive electrode which drives the electro-optical layer. The common electrodes CE are referred to as a second drive electrode which drives the electro-optical layer. As described above, since the common electrode CE also serves as the detection electrode Rx for touch detection of self capacitive sensing, the detection electrodes Rx are also referred to as the second drive electrode which drives the electro-optical layer. In the following, except for a case where explanation is given particularly, the detection electrode Rx is synonymous with the common electrode CE or the drive electrode which drives the electro-optical layer.

[Touch Detection]

A method of detecting a position of an input object such as a finger or a touch pen, in other words, an input position, by using the detection electrode Rx, which is carried out by the display panel PNL will be described. The display panel PNL can determine input position information on the basis of a change in the electrostatic capacitance detected by the detection electrode Rx by using the self capacitive sensing. In this way, a touch or approach of a finger to a touch detection surface of the display panel PNL can be detected.

In the following, a principle and a method of touch detection using the self capacitive sensing will be described. Alternatively, the display panel PNL may determine the input position information on the basis of a change in the electrostatic capacitance detected by the detection electrode Rx by using mutual capacitive sensing. Detection by the self capacitive sensing and detection by the mutual capacitive sensing may be carried out alternately. If the display device includes a detection electrode for self capacitive sensing and a detection electrode for mutual capacitive sensing independently, the self capacitive sensing and the mutual capacitive sensing may be carried out simultaneously. Touch detection by the self capacitive sensing is carried out by inputting a drive signal to the detection electrode Rx itself, and on the basis of a change in the signal output from the detection electrode Rx itself.

The principle of the touch detection method using the self capacitive sensing will be described. The self capacitive sensing uses capacitance Cx1 that the detection electrode Rx has, and capacitance Cx2 produced by a finger or the like of a user who touches the detection electrode Rx. FIGS. 5 to 8 are explanatory diagrams which schematically illustrate a circuit operation of touch detection by self capacitive sensing.

Figure 5:
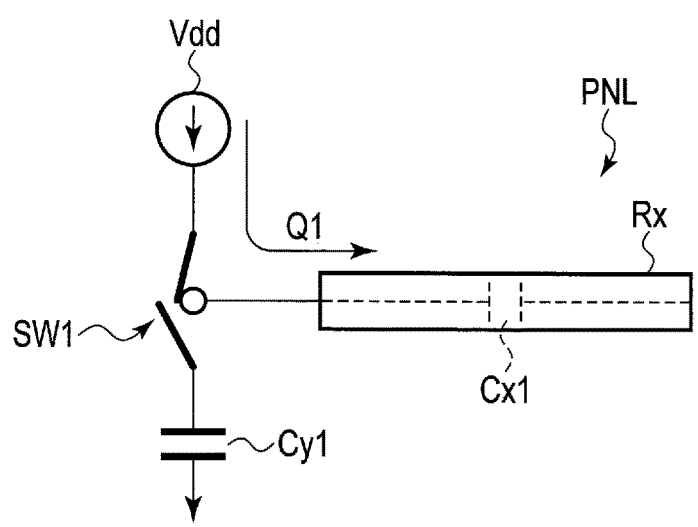
FIG. 5 is an illustration showing an example of touch detection of self capacitive sensing.
Figure 6:
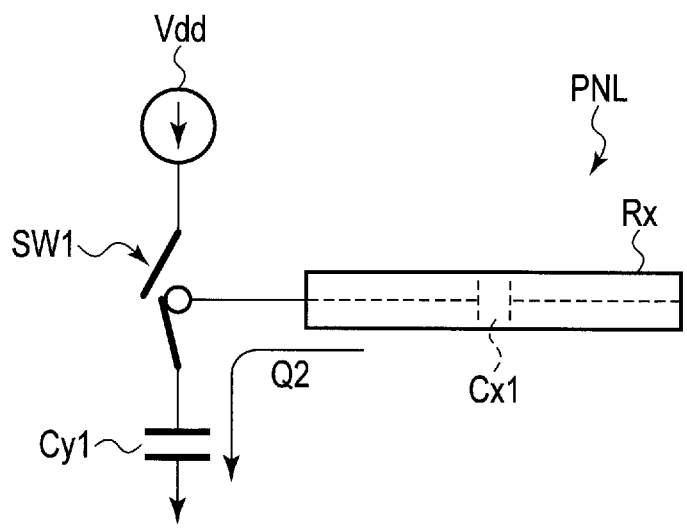
FIG. 6 is an illustration showing an example of touch detection of self capacitive sensing.

FIGS. 5 and 6 show the state in which a finger of the user is not touching the touch detection surface of the display panel PNL. In this state, no electrostatic capacitive coupling occurs between the detection electrode Rx and the finger. FIG. 5 shows the state in which the detection electrode Rx is connected to a power source Vdd by a switch SW1. FIG. 6 shows the state in which the detection electrode Rx is disconnected from the power source Vdd by the switch SW1, and the detection electrode Rx is connected to capacitance Cy1 as a capacitor.

In the state shown in FIG. 5, charge Q1 flows from the power source Vdd toward the capacitance Cx1, and the capacitance Cx1 is charged. In the state shown in FIG. 6, charge Q2 flows from the capacitance Cx1 toward the capacitance Cy1, and the capacitance Cx1 is discharged. The capacitance Cx1 being charged means that a write signal is written to the detection electrode Rx. The capacitance Cx1 being discharged means that a read signal indicating a change in the electrostatic capacitance which has occurred in the detection electrode Rx is read.

Figure 7:
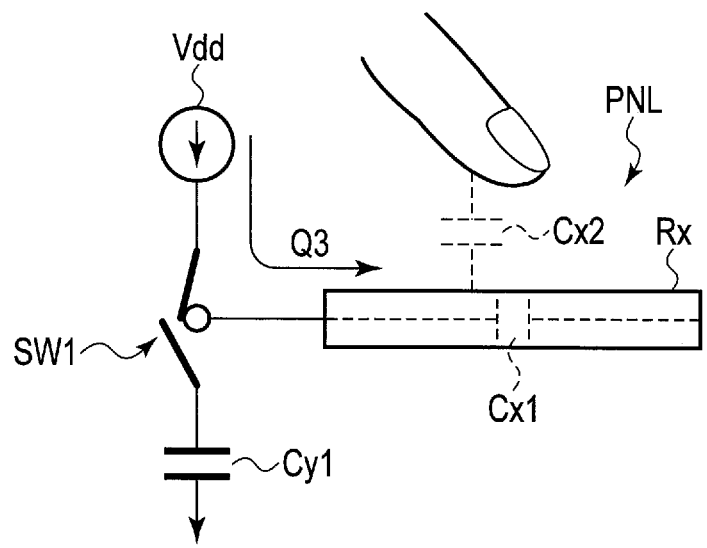
FIG. 7 is an illustration showing an example of touch detection of self capacitive sensing.
Figure 8:
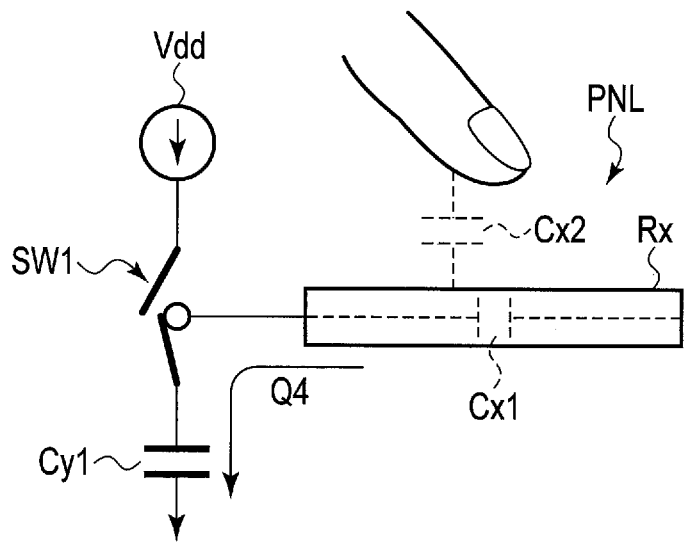
FIG. 8 is an illustration showing an example of touch detection of self capacitive sensing.

FIGS. 7 and 8 show the state in which a finger of the user is touching the touch detection surface of the display panel PNL. In this state, electrostatic capacitive coupling occurs between the detection electrode Rx and the finger. FIG. 7 shows the state in which the detection electrode Rx is connected to the power source Vdd by the switch SW1. FIG. 8 shows the state in which the detection electrode Rx is disconnected from the power source Vdd by the switch SW1, and the detection electrode Rx is connected to the capacitance Cy1.

In the state shown in FIG. 7, charge Q3 flows from the power source Vdd toward the capacitance Cx1, and the capacitance Cx1 is charged. In the state shown in FIG. 8, charge Q4 flows from the capacitance Cx1 toward the capacitance Cy1, and the capacitance Cx1 is discharged.

Time dependence of a voltage charged to the capacitance Cy1 at the time of discharge of the capacitance Cx1 shown in FIG. 6 is different from time dependence of a voltage charged to the capacitance Cy1 at the time of discharge of the capacitance Cx1 shown in FIG. 8 because of presence of the capacitance Cx2 in the state of FIG. 8. Accordingly, in the self capacitive sensing, by using the difference of time dependence of the voltage of the capacitance Cy1 due to presence or absence of the capacitance Cx2, the input position information (for example, whether or not an operation input has been made) is determined.

Figure 9:
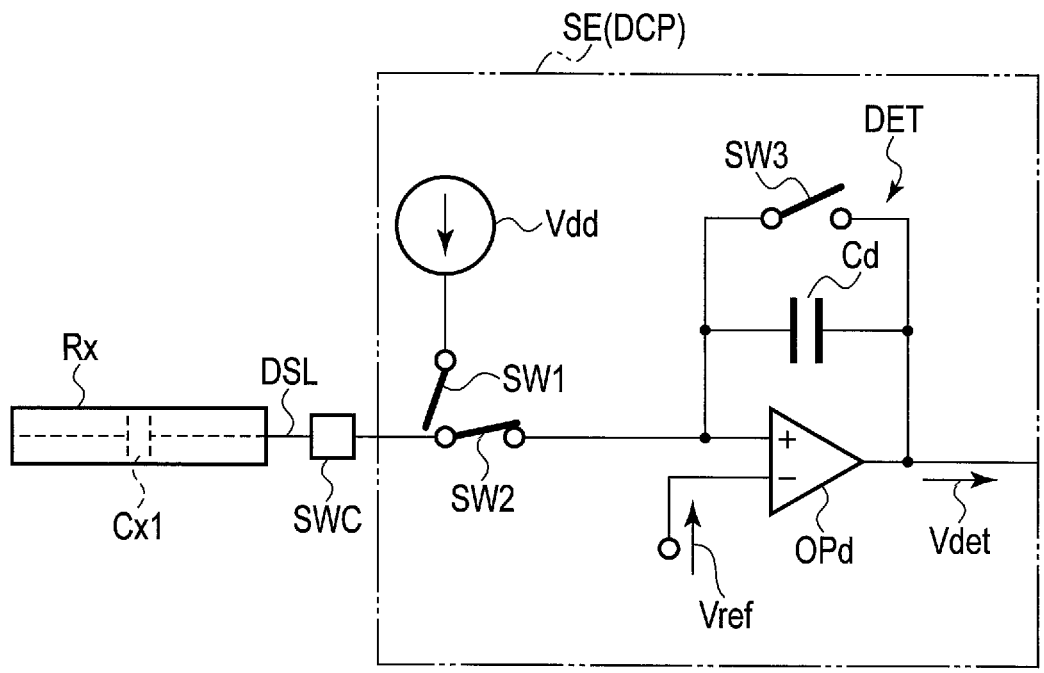
FIG. 9 is a circuit diagram showing an example of touch detection of self capacitive sensing.
Figure 10:
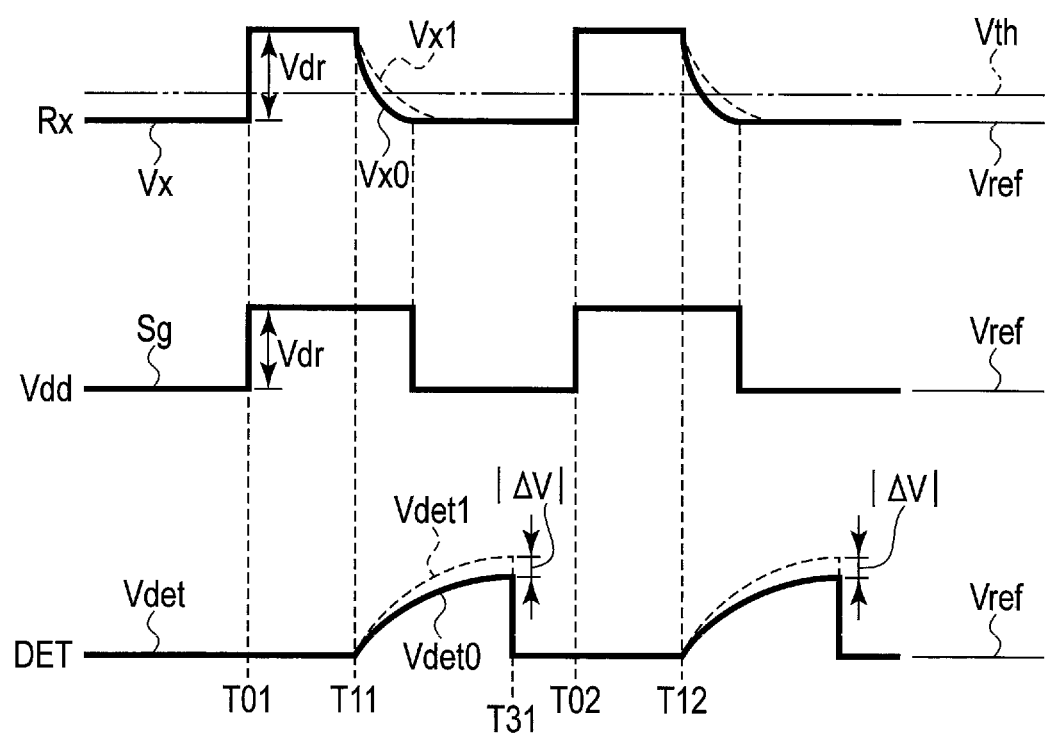
FIG. 10 is a signal waveform diagram showing an example of touch detection of self capacitive sensing.

An example of a circuit which realizes the self capacitive sensing will be described. FIG. 9 shows an example of a circuit which realizes the self capacitive sensing. FIG. 10 shows an example of time dependence of an alternating square wave output from the power source Vdd, a voltage of the detection electrode Rx, and a voltage as an output of a detector DET in the circuit shown in FIG. 9. In FIG. 9, the capacitance of the detection electrode Rx is referred to as the capacitance Cx1. The switch circuit unit SWC shown in FIG. 3 is connected to a midstream part of a detection signal line DSL existing between the detector SE and the detection electrode Rx.

As shown in FIG. 9, by turning on and off the switch SW1, electrical connection between the detection electrode Rx and the power source Vdd is activated or inactivated. By turning on and off the switch SW2, electrical connection between the detection electrode Rx and the detector DET (for example, a voltage detector) is activated or inactivated. The detector DET is an integrating circuit, and comprises, for example, an operational amplifier OPd, capacitance Cd, and a switch SW3. A noninverting input terminal of the operational amplifier OPd is connected to the detection electrode Rx via the switch SW2. A reference signal Vref is input to an inverting input terminal of the operational amplifier OPd.

As shown in FIG. 10, the power source Vdd outputs an alternating square wave Sg whose period is a time difference between time T01 and time T02, and having a waveform height of voltage Vdr. The alternating square wave Sg has a frequency of approximately several kilohertz to several hundreds of kilohertz, for example. The detector DET converts fluctuations in current according to the alternating square wave Sg into fluctuations in voltage (waveform Vdet0 and waveform Vdet1). The waveform Vdet0 and the waveform Vdet1 are generically called waveform Vdet.

As has been described referring to FIG. 9, by turning on and off the switches SW1 and SW2, electrical connection of the detection electrode Rx with the power source Vdd and the detector DET can be switched. In FIG. 10, at time T01, the alternating square wave Sg is raised by an amount corresponding to the voltage Vdr. At time T01, the switch SW1 is turned on, and the switch SW2 is turned off. Accordingly, a voltage Vx of the detection electrode Rx is raised by an amount corresponding to the voltage Vdr at time T01. The switch SW1 is turned off at a point prior to time T11. At this time, if both of the switches SW1 and SW2 are turned off, the detection electrode Rx is in a state of floating electrically, in other words, in a floating state. However, by the capacitance Cx1 (FIG. 5) of the detection electrode Rx, or the capacitance Cx1+Cx2, which is obtained by adding the capacitance Cx2 (FIG. 7) supplemented by a touch of a finger, etc., to the capacitance Cx1 of the detection electrode Rx, the voltage Vx of the detection electrode Rx turns out to be a voltage with the raise of the voltage Vdr being maintained. Further, the switch SW3 is turned on before time T11, and is thereafter turned off before time T11. By this operation, a voltage Vdet as an output of the detector DET is reset. After performing this reset operation, the voltage Vdet of the detector DET becomes substantially equal to a voltage of the reference signal Vref.

Next, the switch SW2 is turned on at time T11. By the above, a voltage input to the noninverting input terminal of the detector DET becomes equal to the voltage Vx of the detection electrode Rx. After that, a voltage of an inverting input portion of the detector DET is lowered to a value of substantially the same level as the reference signal Vref at a response speed according to a time constant referable to the capacitance Cx1 (or the above-mentioned "capacitance Cx1+capacitance Cx2") of the detection electrode Rx and the capacitance Cd included in the detector DET. Since charges accumulated in the capacitance Cx1 (or the capacitance Cx1+Cx2) of the detection electrode Rx are moved to the capacitance Cd included in the detector DET, the voltage Vdet of the detector DET is raised. The voltage Vdet corresponds to the waveform Vdet0 indicated by a solid line when an object such as the finger does not touch the detection electrode Rx. Vdet0 is equal to Cx1×Vdr/Cd (Vdet0=Cx1×Vdr/Cd). The voltage Vdet corresponds to the waveform Vdet1 indicated by a broken line when a capacitance is added by the effect of the touch of the object such as the finger. Vdet1 is equal to (Cx1+Cx2)×Vdr/Cd (Vdet1=(Cx1+Cx2)×Vdr/Cd).

After that, at time T31 which is after occurrence of sufficient movement of the charges of the capacitance Cx1 (or the capacitance Cx1+Cx2) of the detection electrode Rx to the capacitance Cd, the switch SW2 is turned off, and the switches SW1 and SW3 are turned on. By this operation, the voltage of the detection electrode Rx shifts to a voltage corresponding to a low level of the alternating square wave Sg, in other words, a voltage equivalent to a relatively low voltage of the levels of voltage of the square wave. By the reset operation of turning off the switch SW2 and turning on the switch SW3, the voltage as an output from the detector DET is reset. Note that the timing of turning on the switch SW1 may be any as long as the timing is before time T02 after the switch SW2 has been turned off. Also, the timing of resetting the detector DET may be any as long as the timing is before time T12 after the switch SW2 has been turned off.

In a period in which touch detection is performed, the operation explained referring to FIGS. 5 to 10 is repeated at a predetermined frequency (for example, several kilohertz to several hundreds of kilohertz or so) for each of the detection electrodes Rx shown in FIG. 3. Presence or absence of an object which has touched the touch detection surface from the outside (i.e., presence or absence of the touch) can be measured, on the basis of the absolute value |ΔV| of a difference between the waveform Vdet0 and the waveform Vdet1.

In the above, the principle of operation of the self capacitive sensing, and a typical example of a circuit which realizes the self capacitive sensing have been explained. However, a method of realizing the self capacitive sensing includes various modifications. For example, instead of the touch detection by the self capacitive sensing described above, or in addition to the touch detection by the self capacitive sensing described above, touch detection of a modified example as described below may be carried out. When an object such as a finger is not touching the touch detection surface, a waveform of the voltage Vx of the detection electrode Rx corresponds to waveform Vx0 indicated by a solid line. When the capacitance Cx2 produced by the touch of the object such as the finger is added, the waveform of the voltage Vx of the detection electrode Rx corresponds to waveform Vx1 indicated by a broken line. Accordingly, by measuring and comparing the time taken for each of the waveform Vx0 and the waveform Vx1 to be lowered to a point corresponding to a threshold voltage Vth, which is illustratively shown in FIG. 10 with a two-dot chain line, presence or absence of an object which has touched the touch detection surface from the outside (i.e., presence or absence of the touch) can be determined.

[Circuit Configuration of Scanning Line Drive Circuit]

Next, by referring to FIG. 11, a circuit configuration of the scanning line drive circuit GD will be described. FIG. 11 is an illustration showing the circuit configuration of the scanning line drive circuit GD. The scanning line drive circuit GD comprises, as shown in FIG. 11, a plurality of shift register circuits SR1, SR2, . . . , SRn (may be generically called SR), and gate selection switch groups SWG1, SWG2, . . . , SWGn (may be generically called SWG) connected to the respective shift register circuits SR. Each of the gate selection switch groups SWG includes a plurality of gate selection switches SW, and here, it is assumed that each of the gate selection switch groups SWG includes four gate selection switches SW1 to SW4. On and off of the gate selection switch SW is switched on the basis of the control signal, and connection to or disconnection from the corresponding scanning line GL is switched. Note that in the present specification, a case where four gate selection switches SW1 to SW4 are included in each of the gate selection switch groups SWG is assumed. However, the number of gate selection switches SW included in each of the gate selection switch groups SWG is not limited to four. For example, the number of gate selection switches SW included in each of the gate selection switch groups SWG may be two. Alternatively, the number may be eight.

As has been described in the explanation of FIG. 2, the scanning line drive circuit GD is connected to the driver chip DRC via the conductive line W1. The conductive line W1 is a line comprising conductive lines W11 to W13 shown in FIG. 11. In order to simplify the explanation given in FIG. 2, the conductive line W1 is illustrated as a single line. The driver chip DRC supplies the control signals such as a clock signal CKV4, a start pulse signal STV, and enable signals EN1 to EN4 to the scanning line drive circuit GD via the conductive lines W11 to W13.

Each shift register circuit SR is connected to the conductive line W11 for supplying the clock signal CKV4 to each of the shift register circuits SR, the conductive line W12 for supplying the start pulse signal STV, and a conductive line W14 which can supply a signal for switching on and off of the gate selection switch SW.

More specifically, as shown in FIG. 11, the shift register circuits SR are connected to each other in tandem (to be aligned in a Y-axis direction) by the conductive line W11 for supplying the clock signal CKV4. Note that in the following, the shift register circuit SR1 is referred to as the initial-stage shift register circuit SR1, and the shift register circuit SR located next to a predetermined shift register circuit SR is referred to as the shift register circuit SR of the next stage. Each shift register circuit SR is synchronized with the other shift register circuit SR on the basis of the clock signal CKV4. The initial-stage shift register circuit SR1 is connected to the conductive line W12 for supplying the start pulse signal STV. Also, each shift register circuit SR is connected to the other shift register circuit SR (the next-stage shift register circuit SR) provided adjacently in a longitudinal direction by a conductive line 12a for transferring the start pulse signal STV. Each shift register circuit SR is connected to the corresponding gate selection switch group SWG via the conductive line W14.

Each gate selection switch group SWG includes four gate selection switches, i.e., the gate selection switches SW1 to SW4, as described above, and one end of the gate selection switch SW1 of the gate selection switches SW1 to SW4 is connected to a conductive line 13a for supplying the enable signal EN1, and the other end is connected to the corresponding scanning line GL. Also, one end of the gate selection switch SW2 is connected to a conductive line 13b for supplying the enable signal EN2, and the other end is connected to the corresponding scanning line GL. Further, one end of the gate selection switch SW3 is connected to a conductive line 13c for supplying the enable signal EN3, and the other end is connected to the corresponding scanning line GL. One end of the gate selection switch SW4 is connected to a conductive line 13d for supplying the enable signal EN4, and the other end is connected to the corresponding scanning line GL.

The scanning line drive circuit GD selects the shift register circuit SR and the gate selection switch group SWG on the basis of the clock signal CKV4 and the start pulse signal STV, and selects the gate selection switch SW in the selected gate selection switch group SWG, on the basis of the enable signals EN1 to EN4. The selected gate selection switch SW is switched from off to on, and a scanning signal is supplied to the scanning line GL corresponding to the selected gate selection switch SW.

[Display Period and Touch Detection Period]

Figure 12:
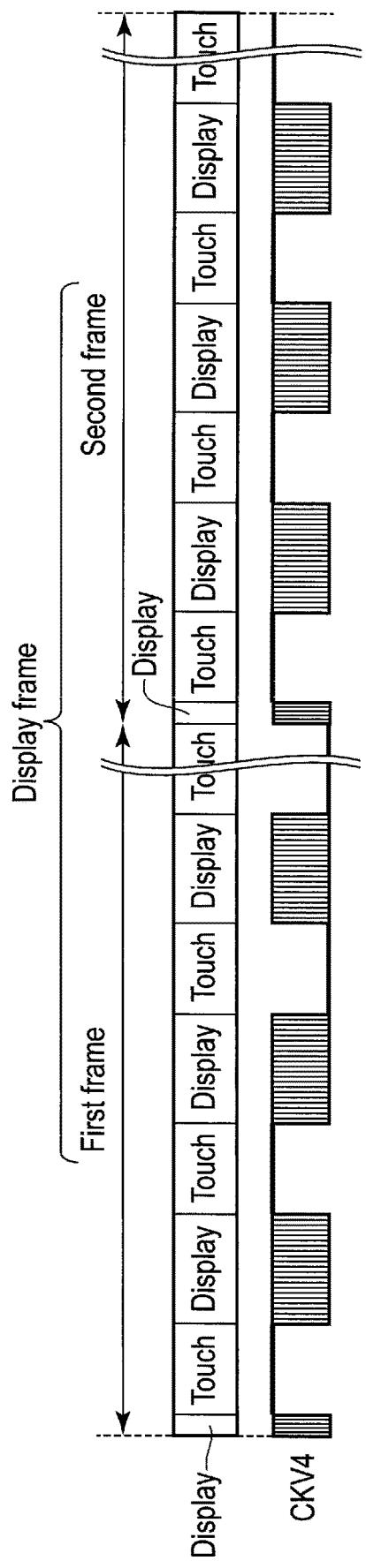
FIG. 12 is an illustration showing the state of the scanning line drive circuit in a display period and a touch detection period.

Next, referring to FIG. 12, the state of the scanning line drive circuit GD in a display period and a touch detection period will be described. FIG. 12 is an illustration showing the state of the scanning line drive circuit GD in the display period and the touch detection period. It should be noted that the display period may be referred to as a pixel write period or a video signal write period, and the touch detection period may be referred to as a touch period or a non-display period.

As shown in FIG. 12, a display frame includes a first frame and a second frame, and the first frame and the second frame both include the display period in which the scanning signal is supplied to the scanning line GL, and the touch detection period related to sensing using the detection electrode Rx. The display period and the touch detection period occur alternately. Note that one display frame lasts for 16.7 msec, for example, and in this case, the first and second frames both last for 8.3 msec. Also, the first frame may be referred to as the first half frame, and the second frame may be referred to as the latter half frame. Furthermore, the first frame and the second frame may both be referred to as a touch frame. When one display frame is finished, (in other words, when the first and second frames are finished), the next display frame is started. In other words, the second frame included in the current display frame is shifted to a first frame included in the next display frame.

Figure 13:
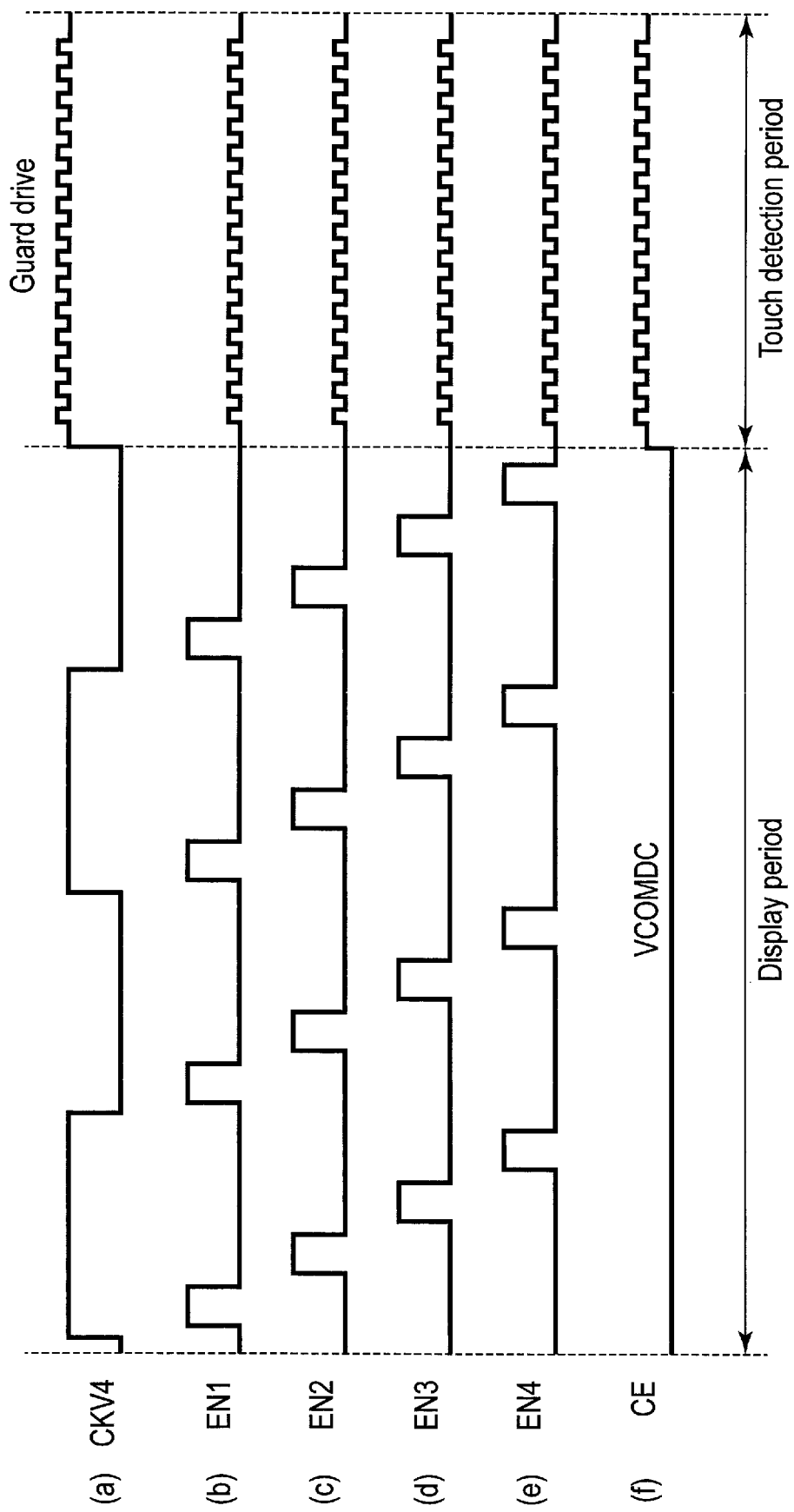
FIG. 13 is a timing chart showing the state of each part of the display device in the display period and the touch detection period.

FIG. 13 is a timing chart showing the state of each part of the display device with the touch detection function in the display period and the touch detection period. During the display period, when the shift register circuit SR receives supply of the start pulse signal STV from the driver chip DRC via the conductive line W12, at a timing synchronized with supply of the clock signal CKV4 from the driver chip DRC performed similarly via the conductive line W11, the shift register circuit SR performs phase shift sequentially, and outputs the control signal (selection signal) to the gate selection switch group SWG.

Here, the clock signal CKV4 is an alternating square wave signal alternating between a high-level potential and a low-level potential for every four lines, as shown by illustration (a) in FIG. 13. The enable signals EN1 to EN4 are output sequentially via the conductive lines W13a to W13d during the time in which the potential of the clock signal CKV4 changes from a high level to a low level or from the low level to the high level, as shown by illustrations (b) to (e) in FIG. 13. By the above, on and off of the switches SW1 to SW4, which are included in the gate selection switch group SWG selected by the control signal output from the shift register circuit SR, are switched sequentially, and the scanning signal can be output to the corresponding scanning line GL.

More specifically, when the start pulse signal STV is supplied to the initial-stage shift register circuit SR1 from the driver chip DRC via the conductive line W12, in accordance with the clock signal CKV4, the control signal is output to the gate selection switch group SWG1, which is the gate selection switch group SWG corresponding to the initial-stage shift register circuit SR1. Consequently, the gate selection switch group SWG1 is selected as the gate selection switch group SWG corresponding to the initial-stage shift register circuit SR1. In this state, as the enable signals EN1 to EN4 are sequentially supplied from the driver chip DRC via the conductive lines W13a to W13d, on and off of the switches SW1 to SW4 included in the selected gate selection switch group SWG1 are switched sequentially, and the scanning signal can be output to the corresponding scanning line GL. When the potential of the clock signal CKV4 is changed from the high level to the low level, the start pulse signal STV is transferred from the shift register circuit SR1 of the initial stage to the shift register circuit SR2 of the next stage via the conductive line 12a, and a similar operation is executed in the shift register circuit SR2 of the next stage as well.

Note that during the display period, as shown by illustration (f) in FIG. 13, a common potential VCOMDC is supplied to the common electrode CE as a drive potential for display via the common potential supply line VCDL, the switch circuit unit SWC, and the common line CML.

During the touch detection period, while a drive signal is supplied to the selected detection electrode Rx, a signal having the same waveform as that of the drive signal is supplied to the other (unselected) detection electrodes Rx as a guard signal, as shown by the illustration (f) in FIG. 13. Generally, when a drive potential is supplied to the selected detection electrode Rx, a potential difference occurs between the unselected detection electrode Rx and the selected detection electrode Rx, and a parasitic capacitance may be caused. However, by inputting the guard signal having the same waveform as that of the drive signal to the unselected detection electrode Rx, the effect of the parasitic capacitance can be reduced. Note that as shown by the illustrations (a) to (e) in FIG. 13, the guard signal is also supplied to each part included in the scanning line drive circuit GD via the conductive lines W11 to W13.

[Guard Signal (Guard Drive)]

Figure 14:
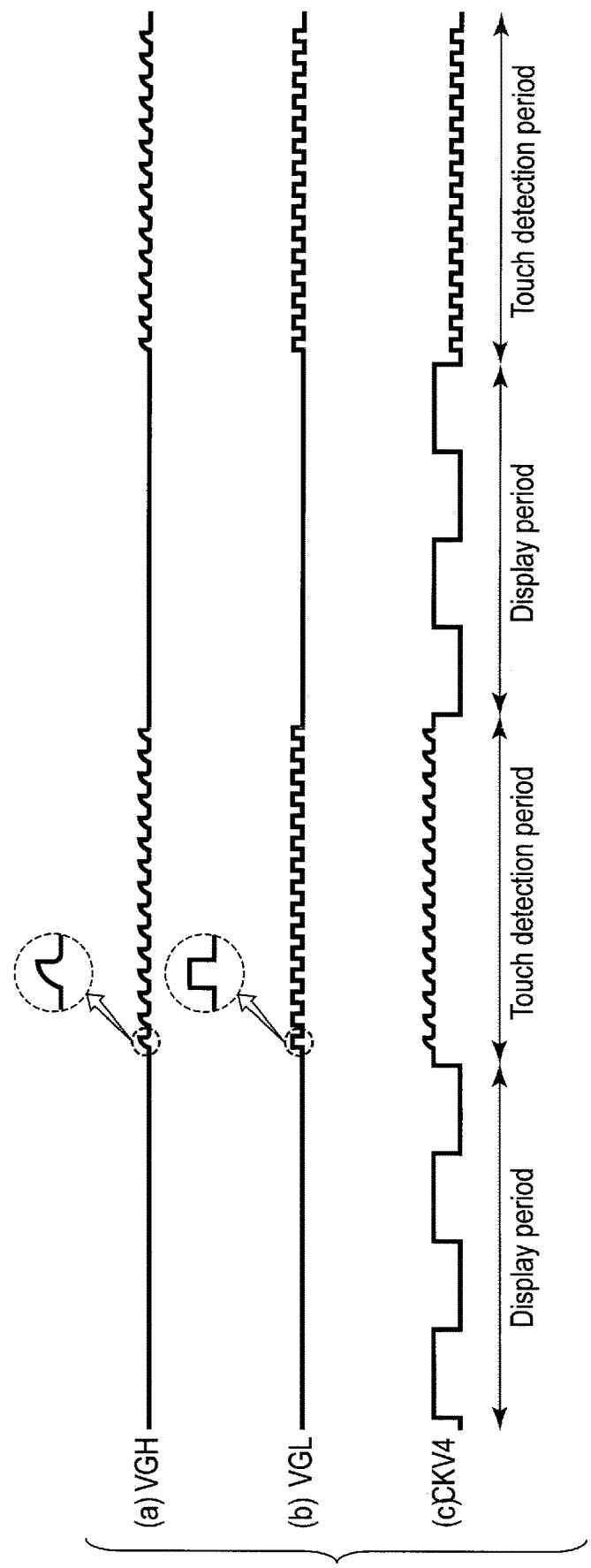
FIG. 14 is a signal waveform diagram showing an example of a guard signal.

As has been explained referring to FIG. 13, in the touch detection period, a guard signal having the same waveform as that of the drive signal to be supplied to the selected detection electrode Rx is supplied to the detection electrodes other than the selected detection electrode Rx. The above is called guard drive. However, the waveform of the guard signal has the feature that it is affected by the potential of a baseline (the state of the potential). More specifically, when the input waveform of the guard signal has the shape as shown by illustration (a) in FIG. 14, and the potential of the baseline is a high-level potential, the output waveform of the guard signal has the shape as shown by illustration (b) in FIG. 14. In other words, the output waveform of the guard signal has a waveform that is weak and blunted (less sharp) as compared to the input waveform. Meanwhile, when the input waveform of the guard signal has the shape as shown by the illustration (a) in FIG. 14, and the potential of the baseline is a low-level potential, the output waveform of the guard signal has the shape as shown by illustration (c) in FIG. 14. That is, although the output waveform of the guard signal becomes blunt as compared to the input waveform, the waveform is stronger and less blunted as compared to the output waveform of the illustration (b) in FIG. 14.

Of various signals supplied to the scanning line drive circuit GD, the start pulse signal STV and the enable signals EN1 to EN4 are signals whose potential of the baseline is always at the low level during the touch detection period. Meanwhile, of various signals supplied to the scanning line drive circuit GD, the clock signal CKV4 is an alternating square wave signal alternating between a high-level potential and a low-level potential for every four lines, and which enters a phase of the touch detection period while maintaining the potential of the display period. Therefore, depending on the number of write lines in one display period, the clock signal CKV4 is a signal whose potential of the baseline in the touch detection period may be varied.

Consequently, a difference may be caused between the potential of the baseline in a predetermined touch detection period in the first frame and the potential of the baseline in the touch detection period of the second frame corresponding to the predetermined touch detection period of the first frame, and a difference may also be caused in the output waveform of the guard signal. As a result of study conducted by the inventor of the present invention, such a difference may become a cause of noise, which is not desirable.

FIG. 15 is an illustration showing changes of the potential of the clock signal CKV4 in a display device with the touch detection function having one hundred and twenty scanning lines GL and in which the number of write lines in one display period is ten. In the following, a case where the potential of the baseline of the clock signal CKV4 starts from the high level is assumed. Also, a case where the first frame and the second frame are both divided into twelve parts, in other words, the case where the first and second frames each include six display periods and six touch detection periods is assumed.

As described above, the clock signal CKV4 is the alternating square wave signal alternating between the high-level potential and the low-level potential for every four lines. Thus, as shown in FIG. 15, the potential of the baseline of the clock signal CKV4 in the first display period DP11 of the first frame is shifted in the order of "high level", "low level", and "high level", and the potential is at high level ultimately. As described above, since the clock signal CKV4 enters a phase of the touch detection period while maintaining the potential of the display period, the potential of the first touch detection period TP11 following the first display period DP11 of the first frame is also at the high level.

Similarly, in the second display period DP12 of the first frame, the potential of the baseline of the clock signal CKV4 is shifted in the order of "high level", "low level", "high level", and "low level", as shown in FIG. 15, and the potential is at low level ultimately. Accordingly, the potential of the second touch detection period TP12 following the second display period DP12 of the first frame is also at the low level.

The potential is similarly shifted thereafter, and the potentials of the touch detection periods TP11 to TP16 included in the first frame correspond to "high level (TP11)", "low level (TP12)", "low level (TP13)", "high level (TP14)", "high level (TP15)", and "low level (TP16)", respectively.

Meanwhile, as shown in FIG. 15, the potential of the baseline of the clock signal CKV4 in the first display period DP21 of the second frame following the last touch detection period T16 of the first frame is shifted in the order of "low level", "high level", and "low level", and the potential is at low level ultimately. Accordingly, the potential of the first touch detection period TP21 following the first display period DP21 of the second frame is also at the low level.

Similarly, in the second display period DP22 of the second frame, the potential of the baseline of the clock signal CKV4 is shifted in the order of "low level", "high level", "low level", and "high level", as shown in FIG. 15, and the potential is at high level ultimately. Accordingly, the potential of the second touch detection period TP22 following the second display period DP22 of the second frame is also at the high level.

The potential is similarly shifted thereafter, and the potentials of the touch detection periods TP21 to TP26 included in the second frame correspond to "low level (TP21)", "high level (TP22)", "high level (TP23)", "low level (TP24)", "low level (TP25)", and "high level (TP26)", respectively.

In other words, the potential of the first touch detection period TP11 included in the first frame does not match the potential of the corresponding first touch detection period TP21 included in the second frame. Also, the potential of the second touch detection period TP12 included in the first frame does not match the potential of the corresponding second touch detection period TP22 included in the second frame. Similarly, the potentials of the touch detection periods TP13 to TP16 included in the first frame also do not match the potentials of the touch detection periods TP23 to TP26 of the second frame corresponding to the touch detection periods TP13 to TP16, respectively.

Accordingly, since a difference in the potential of the baseline is caused between the first frame and the second frame, a difference may also be caused in the output waveform of the guard signal as described above. This can be a potential factor of noise, and is not desirable.

First Embodiment

Hence, in the present embodiment, the number of write lines in one display period is adjusted to eight uniformly. The state as a result of the above is shown in FIG. 16. FIG. 16 is an illustration showing changes of the potential of the clock signal CKV4 in a display device with the touch detection function having one hundred and twenty scanning lines GL, as in the case of FIG. 15, and in which the number of write lines in one display period is eight. Note that a case where the potential of the baseline of the clock signal CKV4 starts from the high level is assumed, as in the case of FIG. 15.

As described above, the clock signal CKV4 is the alternating square wave signal alternating between the high-level potential and the low-level potential for every four lines. Thus, as shown in FIG. 16, the potential of the baseline of the clock signal CKV4 in the first display period DP11 of the first frame is shifted in the order of "high level", "low level", and "high level", and the potential is at high level ultimately. As stated above, since the clock signal CKV4 enters a phase of the touch detection period while maintaining the potential of the display period, the potential of the first touch detection period TP11 following the first display period DP11 of the first frame is also at the high level.

Similarly, in the second display period DP12 of the first frame, the potential of the baseline of the clock signal CKV4 is shifted in the order of "high level", "low level", and "high level", as shown in FIG. 16, and the potential is at high level ultimately. Accordingly, the potential of the second touch detection period TP12 following the second display period DP12 of the first frame is also at the high level.

The potential is similarly shifted thereafter, and the potentials of the touch detection periods TP11 to TP16 included in the first frame correspond to "high level (TP11)", "high level (TP12)", "high level (TP13)", "high level (TP14)", "high level (TP15)", and "high level (TP16)", respectively, in other words, the potentials are at the high level in all of the periods.

Meanwhile, as shown in FIG. 16, the potential of the baseline of the clock signal CKV4 in the first display period DP21 of the second frame following the last touch detection period T16 of the first frame is shifted in the order of "high level", "low level", and "high level", and the potential is at high level ultimately. Accordingly, the potential of the first touch detection period TP21 following the first display period DP21 of the second frame is also at the high level.

Similarly, in the second display period DP22 of the second frame, the potential of the baseline of the clock signal CKV4 is shifted in the order of "high level", "low level", and "high level", as shown in FIG. 16, and the potential is at high level ultimately. Accordingly, the potential of the second touch detection period TP22 following the second display period DP22 of the second frame is also at the high level.

The potential is similarly shifted thereafter, and the potentials of the touch detection periods TP21 to TP26 included in the second frame correspond to "high level (TP21)", "high level (TP22)", "high level (TP23)", "high level (TP24)", "high level (TP25)", and "high level (TP26)", respectively, in other words, the potentials are at the high level in all of the periods.

Note that in the above, a case where each frame includes six occurrences of the display period and the detection period is assumed. Therefore, in the first frame and the second frame, the scanning signals are supplied to ninety-six scanning lines GL (calculated from a multiplication of 8 [lines]×6 [occurrences]×2) from among the one hundred and twenty scanning lines GL. Accordingly, for the remaining twenty-four scanning lines GL, as shown in FIG. 16, the scanning signals are supplied sequentially in a display period to be provided after an end of the second frame. Here, as described above, a case where six display periods and six touch detection periods are included in each frame is assumed. However, the number of display periods and touch detection periods to be included in each frame is not limited to the above. For example, each frame may include seven display periods and seven touch detection periods (in other words, the frame may be divided into fourteen parts). In this case, in the first frame and the second frame, the scanning signals are supplied to one hundred and twelve scanning lines GL (calculated from a multiplication of 8 [lines]×7 [occurrences]×2) from among the one hundred and twenty scanning lines GL, and the scanning signals are supplied sequentially to the remaining eight scanning lines GL in the display period provided separately after an end of the second frame.

According to the case of FIG. 16 explained above, by making the number of write lines in one display period a multiple of 8 uniformly, the potential of the baseline of the first touch detection period TP11 included in the first frame can be made to match the potential of the baseline of the corresponding first touch detection period TP21 of the second frame (i.e., the potentials of the baselines of the touch detection periods TP11 and TP21 are both high-level potentials, as described above). Also, the potential of the baseline of the second touch detection period TP12 included in the first frame matches the potential of the baseline of the corresponding second touch detection period TP22 of the second frame (i.e., the potentials of the baselines of the touch detection periods TP12 and TP22 are both high-level potentials, as described above). Similarly, the potentials of the baselines of the touch detection periods TP13 to TP16 included in the first frame also match the potentials of the baselines of the touch detection periods TP23 to TP26 of the second frame corresponding to the touch detection periods TP13 to TP16, respectively.

In other words, it is possible to prevent a difference in the potential of the baseline from being caused between the first frame and the second frame, and a possibility of causing a difference in the output waveform of the guard signal as well can be reduced. That is, occurrence of noise can be suppressed.

Furthermore, according to the case shown in FIG. 16, the number of write lines in one display period is made uniform, and the scanning signals are supplied to the remaining scanning lines GL in a display period provided separately at the end of the second frame. Therefore, also in a case where the number of scanning lines GL is not one hundred and twenty, or the first and second frames are not each divided into twelve parts, for example, an advantage of being able to perform similar operation can be obtained.

Second Embodiment

Figure 17:
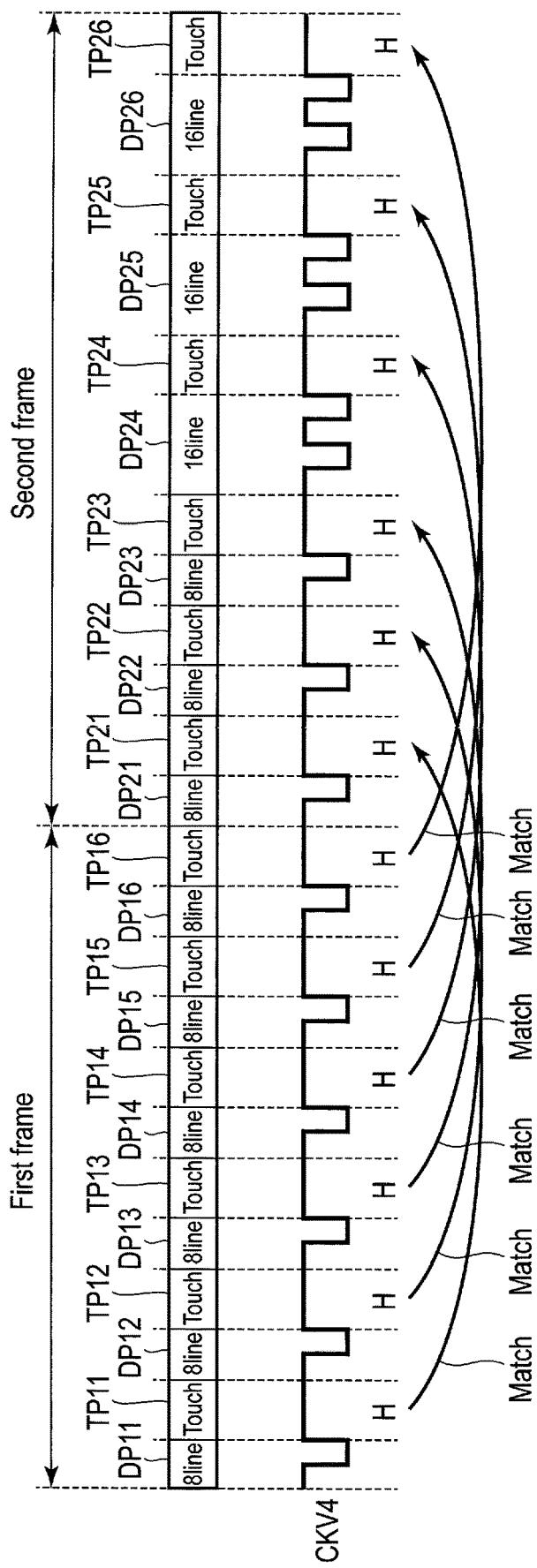
FIG. 17 is an illustration showing an example of a change of the potential of the clock signal.

FIG. 17 is an illustration showing changes of the potential of a clock signal CKV4 in a display device with the touch detection function having one hundred and twenty scanning lines GL, as in the cases of FIGS. 15 and 16, and in which the number of write lines in one display period in a first frame is eight uniformly, and the number of write lines in one display period in a second frame is eight or sixteen. Similarly to the cases of FIGS. 15 and 16, here, a case where the potential of a baseline of the clock signal CKV4 starts from the high level is assumed. Also, similarly to the cases of FIGS. 15 and 16, a case where the first frame and the second frame are both divided into twelve parts, in other words, the case where the first and second frames each include six display periods and six touch detection periods is assumed.

The first frame is similar to the case of FIG. 16 as described above, and thus, detailed explanation of the first frame is omitted. That is, the potentials of touch detection periods TP11 to TP16 included in the first frame correspond to "high level (TP11)", "high level (TP12)", "high level (TP13)", "high level (TP14)", "high level (TP15)", and "high level (TP16)", respectively, in other words, the potentials are at the high level in all of the periods.

Meanwhile, as shown in FIG. 17, in the first display period DP21 of the second frame following the last touch detection period T16 of the first frame, scanning signals are sequentially supplied to eight scanning lines GL, and the potential of the baseline of the clock signal CKV4 is shifted in the order of "high level", "low level", and "high level", so that the potential is at high level ultimately. Accordingly, the potential of the first touch detection period TP21 following the first display period DP21 of the second frame is also at the high level.

Further, also in the second display period DP22 and the third display period DP23 included in the second frame, the scanning signals are sequentially supplied to eight scanning lines GL, as in the first display period DP21, and the potential of the baseline of the clock signal CKV4 is shifted in the order of "high level", "low level", and "high level" in both of the periods, so that the potential is at high level ultimately. Accordingly, the potential of the second touch detection period TP22 following the second display period DP22 of the second frame, and the potential of the third touch detection period TP23 following the display period DP23 are also at the high level.

Further, in the fourth display period DP24 following the third touch detection period TP23 included in the second frame, the scanning signals are sequentially supplied to sixteen scanning lines GL, and the potential of the baseline of the clock signal CKV4 is shifted in the order of "high level", "low level", "high level", "low level", and "high level", so that the potential is at high level ultimately. Accordingly, the potential of the fourth touch detection period TP24 following the fourth display period DP24 of the second frame is also at the high level.

Furthermore, also in the fifth display period DP25 and the sixth display period DP26 included in the second frame, the scanning signals are sequentially supplied to sixteen scanning lines GL as in the fourth display period DP24, and the potential of the baseline of the clock signal CKV4 is shifted in the order of "high level", "low level", "high level", "low level", and "high level" in both of the periods, so that the potential is at high level ultimately. Accordingly, the potential of the fifth touch detection period TP25 following the fifth display period DP25 of the second frame, and the potential of the sixth touch detection period TP26 following the display period DP26 are also at the high level.

As described above, the potentials of the touch detection periods TP21 to TP26 included in the second frame correspond to "high level (TP21)", "high level (TP22)", "high level (TP23)", "high level (TP24)", "high level (TP25)", and "high level (TP26)", respectively, in other words, the potentials are at the high level in all of the periods.

According to the case of FIG. 17 explained above, by making the number of write lines in one display period a multiple of 8 for every display period, the potential of the baseline of the first touch detection period TP11 included in the first frame can be made to match the potential of the baseline of the corresponding first touch detection period TP21 of the second frame (i.e., the potentials of the baselines of the touch detection periods TP11 and TP21 are both high-level potentials, as described above). Also, the potential of the baseline of the second touch detection period TP12 included in the first frame matches the potential of the baseline of the corresponding second touch detection period TP22 of the second frame (i.e., the potentials of the baselines of the touch detection periods TP12 and TP22 are both high-level potentials, as described above). Similarly, the potentials of the baselines of the touch detection periods TP13 to TP16 included in the first frame also match the potentials of the baselines of the touch detection periods TP23 to TP26 of the second frame corresponding to the touch detection periods TP13 to TP16, respectively.

Accordingly, also in the case shown in FIG. 17, it is possible to prevent a difference in the potential of the baseline from being caused between the first frame and the second frame, and a possibility of causing a difference in the output waveform of the guard signal as well can be reduced. That is, occurrence of noise can be suppressed.

Also, according to the case shown in FIG. 17, since the number of write lines in one display period is not uniformly made the same, unlike the case shown in FIG. 16, an advantage of eliminating the need for providing a display period separately at the end of the second frame can be obtained.

Third Embodiment

FIG. 18 is an illustration showing changes of the potential of a clock signal CKV4 in a display device with the touch detection function having one hundred and twenty scanning lines GL, as in the cases of FIGS. 15 to 17, and in which the number of write lines in one display period in a first frame is four or twelve, and the number of write lines in one display period in a second frame is twelve uniformly. Also in this embodiment, similarly to the cases of FIGS. 15 to 17, a case where the potential of the baseline of the clock signal CKV4 starts from the high level is assumed. In addition, similarly to the cases of FIGS. 15 to 17, a case where the first frame and the second frame are both divided into twelve parts, in other words, the case where the first and second frames each include six display periods and six touch detection periods is assumed. Note that the present embodiment is applicable to a case where the first and second frames are divided into an even number of parts.

As shown in FIG. 18, in the first display period DP11 included in the first frame, scanning signals are sequentially supplied to four scanning lines GL, and the potential of the baseline of the clock signal CKV4 is shifted in the order of "high level" and "low level", so that the potential is at low level ultimately. Accordingly, the potential of the first touch detection period TP11 following the first display period DP11 of the first frame is also at the low level.

Further, also in the second display period DP12 and the third display period DP13 included in the first frame, as shown in FIG. 18, the scanning signals are sequentially supplied to four scanning lines GL, as in the first display period DP11, and the potential of the baseline of the clock signal CKV4 is shifted in the order of "low level" and "high level" in the display period DP12, and "high level" and "low level" in the display period DP13. In other words, ultimately, the potential is at the high level in the display period DP12, and is at the low level in the display period DP13. Accordingly, the potential of the second touch detection period TP12 following the second display period DP12 included in the first frame is at the high level, and the potential of the third touch detection period TP13 following the display period DP13 is at the low level.

Further, in the fourth display period DP14 following the third touch detection period TP13 included in the first frame, as shown in FIG. 18, the scanning signals are sequentially supplied to twelve scanning lines GL, and the potential of the baseline of the clock signal CKV4 is shifted in the order of "low level", "high level", "low level", and "high level". In other words, the potential is at the high level ultimately. Accordingly, the potential of the fourth touch detection period TP14 following the fourth display period DP14 included in the first frame is also at the high level.

Furthermore, also in the fifth display period DP15 and the sixth display period DP16 included in the first frame, as shown in FIG. 18, the scanning signals are sequentially supplied to twelve scanning lines GL, as in the fourth display period DP14, and the potential of the baseline of the clock signal CKV4 is shifted in the order of "high level", "low level", "high level", and "low level" in the display period DP15, and "low level", "high level", "low level", and "high level" in the display period DP16. In other words, ultimately, the potential is at the low level in the display period DP15, and is at the high level in the display period DP16. Accordingly, the potential of the fifth touch detection period TP15 following the fifth display period DP15 included in the first frame is at the low level, and the potential of the sixth touch detection period TP16 following the display period DP16 is at the high level.

As described above, the potentials of the touch detection periods TP11 to TP16 included in the first frame correspond to "low level (TP11)", "high level (TP12)", "low level (TP13)", "high level (TP14)", "low level (TP15)", and "high level (TP16)", respectively.

Meanwhile, as shown in FIG. 18, in the first display period DP21 of the second frame following the last touch detection period T16 of the first frame, the scanning signals are sequentially supplied to twelve scanning lines GL, and the potential of the baseline of the clock signal CKV4 is shifted in the order of "high level", "low level", "high level", and "low level", so that the potential is at low level ultimately. Accordingly, the potential of the first touch detection period TP21 following the first display period DP21 of the second frame is also at the low level.

Similarly, in the second display period DP22 of the second frame, the potential of the baseline of the clock signal CKV4 is shifted in the order of "low level", "high level", "low level", and "high level", as shown in FIG. 18, and the potential is at high level ultimately. Accordingly, the potential of the second touch detection period TP22 following the second display period DP22 of the second frame is also at the high level.

The potential is sequentially shifted thereafter, and the potentials of the touch detection periods TP21 to TP26 included in the second frame correspond to "low level (TP21)", "high level (TP22)", "low level (TP23)", "high level (TP24)", "low level (TP25)", and "high level (TP26)", respectively.

According to the case of FIG. 18 explained above, by making the number of write lines in one display period a multiple of 4 and not a multiple of 8 for all of the display periods, the potential of the baseline of the first touch detection period TP11 included in the first frame can be made to match the potential of the baseline of the corresponding first touch detection period TP21 of the second frame (i.e., the potentials of the baselines of the touch detection periods TP11 and TP21 are both low-level potentials, as described above). Also, the potential of the baseline of the second touch detection period TP12 included in the first frame matches the potential of the baseline of the corresponding second touch detection period TP22 of the second frame (i.e., the potentials of the baselines of the touch detection periods TP12 and TP22 are both high-level potentials, as described above). Similarly, the potentials of the baselines of the touch detection periods TP13 to TP16 included in the first frame also match the potentials of the baselines of the touch detection periods TP23 to TP26 of the second frame corresponding to the touch detection periods TP13 to TP16, respectively.

Accordingly, also in the case shown in FIG. 18, it is possible to prevent a difference in the potential of the baseline from being caused between the first frame and the second frame, and a possibility of causing a difference in the output waveform of the guard signal as well can be reduced. That is, occurrence of noise can be suppressed.

Also, in the case shown in FIG. 18, similarly to the case shown in FIG. 17, the number of write lines in one display period is not uniformly made the same. Thus, an advantage of eliminating the need for providing a display period separately at the end of the second frame can be obtained.

Note that in the present embodiment, a case where the number of scanning lines GL is one hundred and twenty is assumed in giving the explanation. However, the number of scanning lines GL is not limited to the above, and may be any arbitrary number. Also, in the present embodiment, although the clock signal has been described as an alternating square wave signal alternating between a high-level potential and a low-level potential for every four lines, the clock signal is not limited to the above. That is, the clock signal may be an alternating square wave signal alternating between a high-level potential and a low-level potential for every N lines (where N is a positive integer).

According to one embodiment described above, a display device capable of reducing a parasitic capacitance at the time of driving a drive electrode by self capacitive sensing can be provided.

The present invention is not limited to the embodiments described above but the constituent elements of the invention can be modified in various manners without departing from the spirit and scope of the invention. Various aspects of the invention can also be extracted from any appropriate combination of a plurality of constituent elements disclosed in the embodiments. Some constituent elements may be deleted in all of the constituent elements disclosed in the embodiments. The constituent elements described in different embodiments may be combined arbitrarily.

What is claimed is:

1. A display device comprising:
   a display portion comprising a plurality of electrodes which are arranged two-dimensionally on a substrate;
   a touch detection circuit which supplies a drive signal for touch detection to an electrode selected from among the plurality of electrodes, receives a signal from the selected electrode, and outputs a guard signal for reducing a parasitic capacitance to unselected electrodes; and
   a scanning line drive circuit which supplies a scanning signal to a plurality of scanning lines extending in the display portion, wherein
   a frame period, which comprises a display period in which the scanning signal is supplied to the plurality of scanning lines for image display, and a touch detection period related to sensing using the plurality of electrodes, includes a first frame and a second frame, and
   the number of scanning lines to which the scanning signal is supplied in each display period included in the first and second frames is adjusted such that a potential of the touch detection period included in the first frame matches a potential of the touch detection period included in the second frame.

2. The display device of claim 1, wherein the first and second frames each include a plurality of display periods and a plurality of touch detection periods, and the display period and the touch detection period occur alternately.

3. The display device of claim 1, wherein the potential of each of the touch detection periods included in the first and second frames is equal to a potential of an immediately preceding display period.

4. The display device of claim 1, wherein:
   the number of scanning lines to which the scanning signal is supplied in each of the display periods included in the first and second frames is adjusted to be equal to a multiple of 8 uniformly; and
   the scanning line drive circuit supplies the scanning signal to the scanning lines, the number of which is adjusted to be equal to the multiple of 8, in each of the display periods included in the first and second frames, and supplies the scanning signal to remaining scanning lines in a display period provided separately at an end of the second frame.

5. The display device of claim 1, wherein:
   the number of scanning lines to which the scanning signal is supplied in the display period included in the first and second frames is adjusted to be either x which is a multiple of 8 or y which is a multiple of 8 and is different from x; and
   the scanning line drive circuit supplies the scanning signal to the x or y scanning lines in each of the display periods included in the first and second frames.

6. The display device of claim 1, wherein:
   the number of scanning lines to which the scanning signal is supplied in the display period included in the first and second frames is adjusted to be either X which is a multiple of 4 and not a multiple of 8, or Y which is a multiple of 4 and not a multiple of 8, and is different from X; and
   the scanning line drive circuit supplies the scanning signal to the X or Y scanning lines in each of the display periods included in the first and second frames.

7. The display device of claim 1, wherein:
   the scanning line drive circuit is connected to a driver chip configured to output a control signal; and
   a clock signal, which is one kind of the control signal output from the driver chip, is an alternating square wave signal alternating between a high-level potential and a low-level potential for every four scanning lines.

8. The display device of claim 7, wherein the scanning line drive circuit starts an operation when an input of a start pulse signal, which is one kind of the control signal output from the driver chip, is received.

9. A method of driving a display device which comprises: a display portion comprising a plurality of electrodes arranged two-dimensionally on a substrate; a touch detection circuit which supplies a drive signal for touch detection to an electrode selected from among the plurality of electrodes, receives a signal from the selected electrode, and outputs a guard signal for reducing a parasitic capacitance to unselected electrodes; and a scanning line drive circuit which supplies a scanning signal to a plurality of scanning lines extending in the display portion, in which
   a frame period, which comprises a display period in which the scanning signal is supplied to the plurality of scanning lines for image display, and a touch detection period related to sensing using the plurality of electrodes, includes a first frame and a second frame,
   the method comprising:
   adjusting the number of scanning lines to which the scanning signal is supplied in each display period included in the first and second frames such that a potential of the touch detection period included in the first frame matches a potential of the touch detection period included in the second frame.

10. The method of claim 9, wherein the first and second frames each include a plurality of display periods and a plurality of touch detection periods, and the display period and the touch detection period occur alternately.

11. The method of claim 9, wherein the potential of each of the touch detection periods included in the first and second frames is equal to a potential of an immediately preceding display period.

12. The method of claim 9, further comprising:
adjusting the number of scanning lines to which the scanning signal is supplied in each of the display periods included in the first and second frames to be equal to a multiple of 8 uniformly; and
supplying the scanning signal to the scanning lines, the number of which is adjusted to be equal to the multiple of 8, in each of the display periods included in the first and second frames, and supplying the scanning signal to remaining scanning lines in a display period provided separately at an end of the second frame.

13. The method of claim 9, further comprising:
adjusting the number of scanning lines to which the scanning signal is supplied in the display period included in the first and second frames to be either x which is a multiple of 8 or y which is a multiple of 8 and is different from x; and
supplying the scanning signal to the x or y scanning lines in each of the display periods included in the first and second frames.

14. The method of claim 9, further comprising:
adjusting the number of scanning lines to which the scanning signal is supplied in the display period included in the first and second frames to be either X which is a multiple of 4 and not a multiple of 8, or Y which is a multiple of 4 and not a multiple of 8, and is different from X; and
supplying the scanning signal to the X or Y scanning lines in each of the display periods included in the first and second frames.

15. The method of claim 9, wherein:
the scanning line drive circuit is connected to a driver chip configured to output a control signal; and
a clock signal, which is one kind of the control signal output from the driver chip, is an alternating square wave signal alternating between a high-level potential and a low-level potential for every four scanning lines.

16. The method of claim 15, further comprising starting an operation when an input of a start pulse signal, which is one kind of the control signal output from the driver chip, is received.

17. A display device comprising:
a display portion comprising a plurality of electrodes which are arranged two-dimensionally on a substrate; and
a scanning line drive circuit which supplies a scanning signal to a plurality of scanning lines extending in the display portion, wherein
the scanning line drive circuit comprises:
a plurality of switch groups including a plurality of switches connected to the plurality of scanning lines, respectively; and
a plurality of shift registers provided for the plurality of switch groups, respectively,
a frame period, which comprises a display period in which the scanning signal is supplied to the plurality of scanning lines for image display, and a touch detection period related to sensing using the plurality of electrodes, includes a first frame and a second frame, and
the scanning line drive circuit selects one of the switch groups and one of the shift registers in sequence so that a potential of the touch detection period included in the first frame matches a potential of the touch detection period included in the second frame, and selects a switch of the plurality of switches included in the selected switch group one by one to supply the scanning signal to the scanning line connected to the selected switch.

18. The display device of claim 17, wherein:
the number of scanning lines to which the scanning signal is supplied in each of the display periods included in the first and second frames is adjusted to be equal to a multiple of 8 uniformly; and
the scanning line drive circuit supplies the scanning signal to the scanning lines, the number of which is adjusted to be equal to the multiple of 8, in each of the display periods included in the first and second frames, and supplies the scanning signal to remaining scanning lines in a display period provided separately at an end of the second frame.

19. The display device of claim 17, wherein:
the number of scanning lines to which the scanning signal is supplied in the display period included in the first and second frames is adjusted to be either x which is a multiple of 8 or y which is a multiple of 8 and is different from x; and
the scanning line drive circuit supplies the scanning signal to the x or y scanning lines in each of the display periods included in the first and second frames.

20. The display device of claim 17, wherein:
the number of scanning lines to which the scanning signal is supplied in the display period included in the first and second frames is adjusted to be either X which is a multiple of 4 and not a multiple of 8, or Y which is a multiple of 4 and not a multiple of 8, and is different from X; and
the scanning line drive circuit supplies the scanning signal to the X or Y scanning lines in each of the display periods included in the first and second frames.

* * * * *